United States Patent [19]
Ferrari

[11] 3,944,728
[45] Mar. 16, 1976

[54] VIDEO INFORMATION RECORDING AND REPRODUCTION

[75] Inventor: Leonard A. Ferrari, San Clemente, Calif.

[73] Assignee: Bell & Howell Company, Chicago, Ill.

[22] Filed: Dec. 10, 1974

[21] Appl. No.: 531,408

Related U.S. Application Data

[63] Continuation-in-part of Ser. No. 293,713, Sept. 29, 1972, abandoned.

[52] U.S. Cl............................ 178/6.6 A; 178/6.6 SF
[51] Int. Cl.².............................................. H04N 5/78
[58] Field of Search......... 178/6.6 A, 6.6 FS, 6.6 SF

[56] References Cited
UNITED STATES PATENTS

| | | | |
|---|---|---|---|
| 3,170,031 | 2/1965 | Okamura | 178/6.6 FS |
| 3,294,902 | 12/1966 | Maxey | 178/6.6 FS |
| 3,395,248 | 7/1968 | Suzuki et al. | 178/6.6 FS |
| 3,470,315 | 9/1969 | Kinara | 178/6.6 SF |
| 3,652,788 | 3/1972 | Nakashima et al. | 178/6.6 FS |
| 3,726,995 | 4/1973 | Lehmann | 178/6.6 FS |

*Primary Examiner*—Harvey E. Springborn
*Attorney, Agent, or Firm*—Benoit Law Corporation

[57] ABSTRACT

Methods and apparatus for recording and subsequently reproducing video information at a display scan rate record image fields or other video signal quanta on a recording medium at a first relative recording medium velocity and in accordance with a predetermined arithmetic progression. The recorded image fields or other video signal quanta are reproduced at a second relative velocity being higher than the first velocity so that the reproduced video signal quanta are synchronized at the display scan rate. The reproduction of recorded image field or video signal quanta is repeated in the same reproducing operation at the second relative velocity. The repeated reproduction of any recorded image field or other video signal quantum in the same reproducing operation is completed before commencement of the reproduction of any recorded image field or other video signal quantum whose number in the predetermined arithmetic progression occurs more than one term after the number of the particular image field or other video signal quantum. Each occurring image field or other video signal quantum may be recorded by this method or apparatus. On the other hand, skip field techniques may be realized by the methods and apparatus of the subject invention.

79 Claims, 24 Drawing Figures

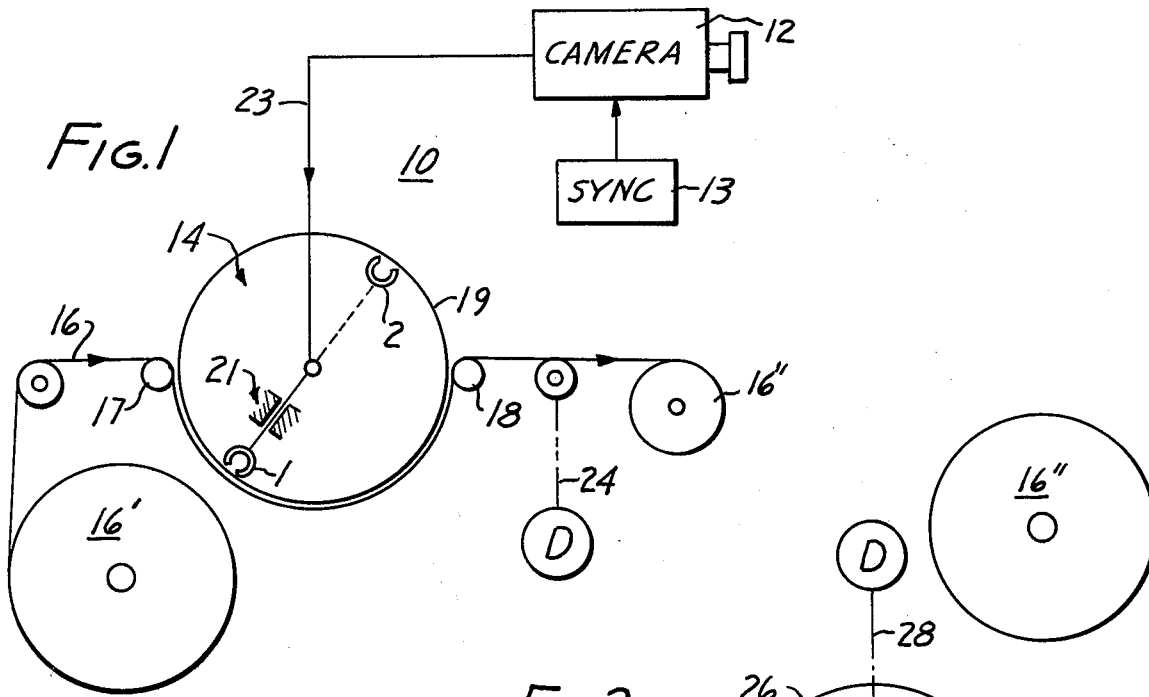
Fig.1
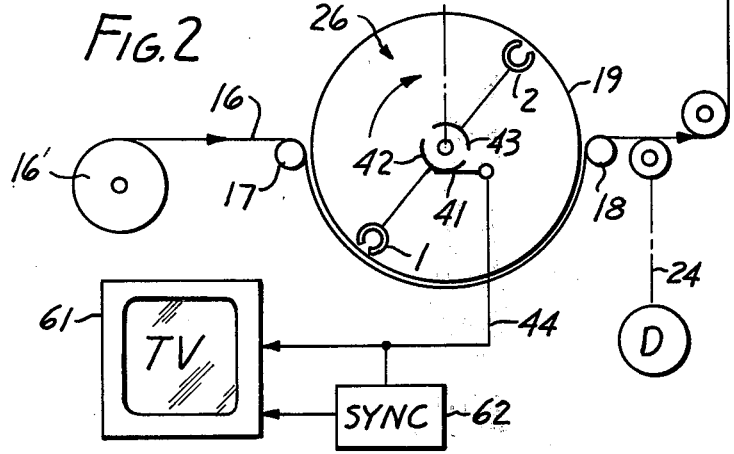
Fig.2
Fig.3
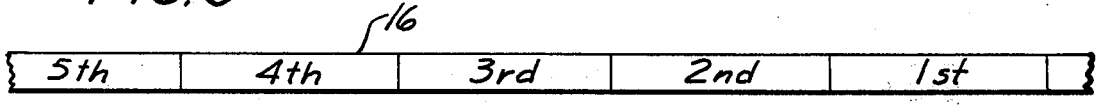
| HEAD | FIELD | FRAME |
|------|-------|-------|
| 1 | 1 | 1 |
| 1 | 2 | |
| 2 | 1 | 1 |
| 2 | 2 | |
| 2 | 3 | 2 |
| 2 | 4 | |
| 1 | 3 | 2 |
| 1 | 4 | |
| 1 | 5 | 3 |
| 1 | ET SEQ. | |
Fig.4

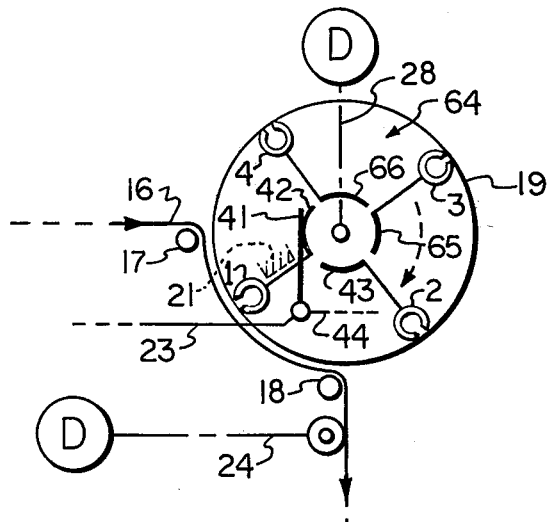
FIG. 5
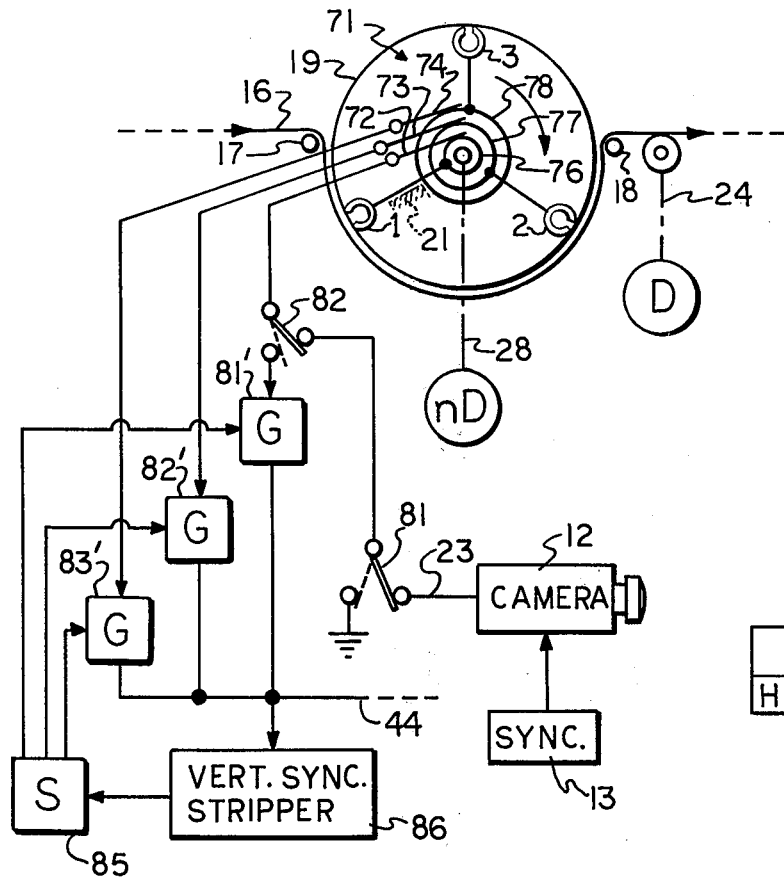
FIG. 7
FIG. 6
| HEAD | FIELD |
|---|---|
| 1 | 1 |
| 2 | 1 |
| 2 | 2 |
| 3 | 2 |
| 3 | 3 |
| 4 | 3 |
| 4 | 4 |
| 1 | 4 |
| 1 | 5 |
SET SEQ.
FIG. 9
$V_H = -3V_T$
| HEAD | FIELD |
|---|---|
| 1 | 1 |
| 2 | 1 |
| 3 | 1 |
| 1 | 1 |
| 2 | 2 |
| 3 | 2 |
| 1 | 2 |
| 2 | 2 |
| 3 | 2 |
| 1 | 2 |
| 2 | 3 |
| 3 | 3 |
| 1 | 3 |
| 1 | 4 |
SET SEQ.
FIG. 8
$V_H = -V_T$
| HEAD | FIELD |
|---|---|
| 1 | 1 |
| 2 | 1 |
| 2 | 2 |
| 3 | 2 |
| 3 | 3 |
| 1 | 3 |
| 1 | 4 |
SET SEQ.

| d = 4 | | | |
|---|---|---|---|
| RECORD $V_H = -3V_T$ | | REPLAY $V_H = -3V_T$ | |
| HEAD | FIELD | HEAD | FIELD |
| 1 | 1 | 1 | 1 |
| 2 | | 2 | 1 |
| 3 | | 3 | 1 |
| 1 | | 1 | 1 |
| 1 | 5 | 1 | 5 |
| 2 | | 2 | 5 |
| 3 | | 3 | 5 |
| 1 | | 1 | 5 |
| 1 | 9 | 1 | 9 |
| 2 | | 2 | 9 |
| 3 | | 3 | 9 |
| 1 | | 1 | 9 |
| | ET SEQ. | | |

FIG. 10

| d = 2 | | | | | |
|---|---|---|---|---|---|
| RECORD $V_H = -V_T$ TAPE=90°WRAP | | REPLAY $V_H = -V_T$ TAPE=90°WRAP | | REPLAY $V_H = -V_T$ TAPE=180°WRAP | |
| HEAD | FIELD | HEAD | FIELD | HEAD | FIELD |
| 1 | 1 | 1 | 1 | 1 | 1 |
| | | 2 | 1 | 1 | 3 |
| 2 | 3 | 2 | 3 | 3 | 1 |
| | | 3 | 3 | 3 | 3 |
| 3 | 5 | 3 | 5 | 3 | 5 |
| | | 4 | 5 | 3 | 7 |
| 4 | 7 | 4 | 7 | 1 | 5 |
| | | 1 | 7 | 1 | 7 |
| 1 | 9 | 1 | 9 | 1 | 9 |
| | | | | 1 | 13 |
| | ET SEQ. | | | 3 | 9 |

FIG. 15

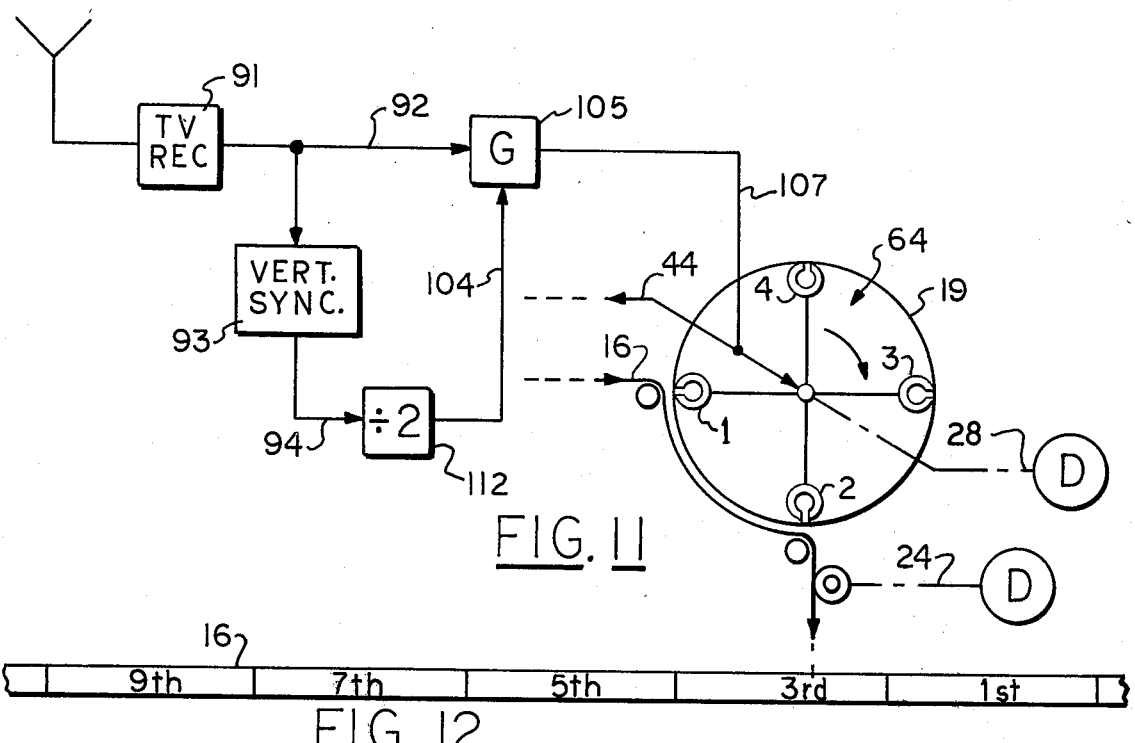
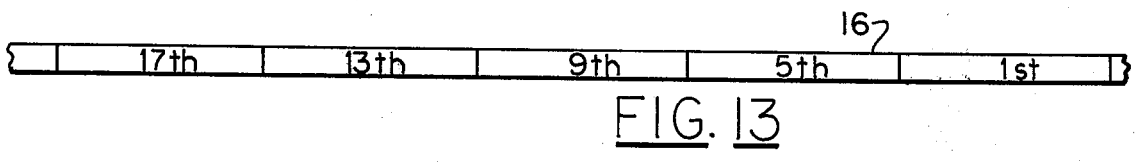
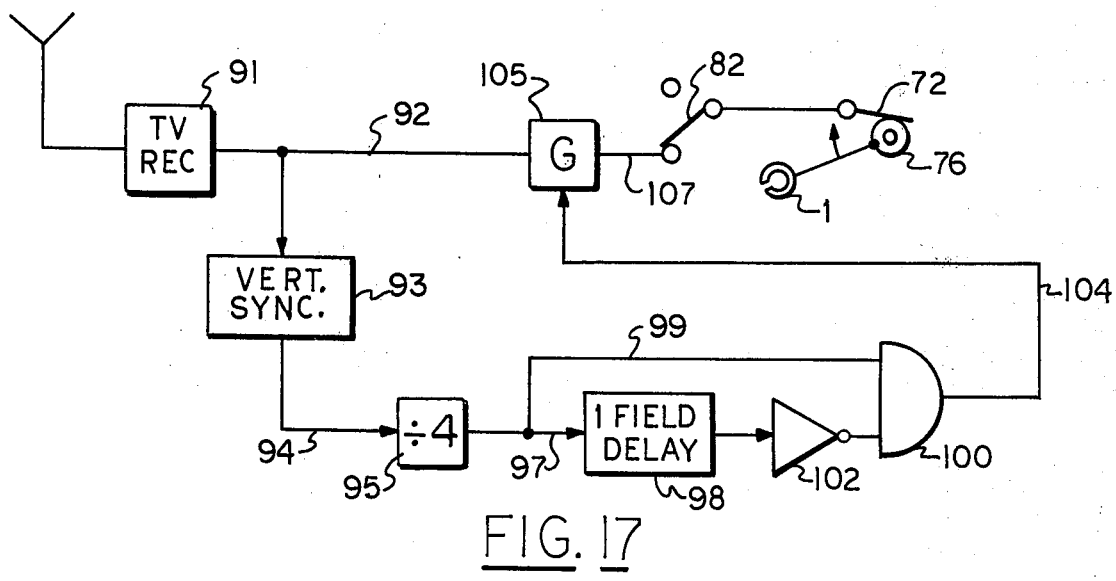

VIDEO INFORMATION RECORDING AND REPRODUCTION

CROSS-REFERENCE

This is a continuation-in-part of my previous U.S. Pat. application Ser. No. 293,713, filed Sept. 29, 1972 which is now abandoned.

BACKGROUND OF THE INVENTION

1. Field of the Invention

The subject invention relates to the recording, the reproduction and the display of video information.

2. Description of the Prior Art

Recent years have seen an increasing sophistication of video recording and display methods and apparatus. However, despite tremendous efforts, the television industry still has now been able to place video recording and playback equipment within the reach of the public at large. Few institutions and even fewer individuals can afford to equip themselves with video recording and playback apparatus.

Existing approaches to the problem call for equipment which has to meet very high quality requirements and which for that reason is bound to be expensive and complicated. Existing approaches also require equipment with extremely high bandwidth handling capability.

The effects of this problem are particularly felt in the areas of video tape and video disk recording and playback. In both of these areas, the video information is recorded in what may be called "a multiply coiled recording track." In particular, this multiply coiled recording trach in the case of a video disk is typically the spiral track in which the video information is recorded. In the case of video tape, the multiply coiled recording track comes about when the tape is wound on a coil during the recording process.

The point in both instances is that the longer the recording track needed for recording given video program, the larger will be the size of the recording medium, such as the coiled recording tape or the video disk, necessary for containing the recorded video program. This either renders video tape coils and video disks too bulky for many applications or then requires the provision of several tapes or disks even for programs of moderate length.

Skip field techniques alone frequently have not been adequate for satisfactorily solving this problem, as such methods have tended to introduce a certain choppiness into the video display at the point where they could have yielded some useful reduction in tape coil or video disk size or number. This applies to prior-art skip field techniques in general, including the skip field methods disclosed in German Patent Publication No. 1,214,719, by Telefunken Patentverwertungsgesellschaft m.b.H., issued Apr. 21, 1966; U.S. Pat. No. 3,470,315, by N. Kihara, issued Sept. 30, 1969; and U.S. Pat. No. 3,652,788, by T. Nakashima, issued Mar. 28, 1972, for instance.

In an effort to reduce the flicker of slow scan images, the German Patent Specification No. 1,051,318, by Fernseh G.m.b.H., issued Aug. 20, 1959, suggested that each image be recorded on an endless magnetic carrier and be continuously and repeatedly reproduced from that endless carrier. That proposal had the inherent disadvantage that it necessitated provision of a bypass path for the playback head past the recording head and periodic, rapid channeling of the playback head away from the endless carrier and along said bypass path. The latter German Patent thus also failed to provide a contribution to a reduction in size of the requisite recording media.

SUMMARY OF THE INVENTION

It is an object of this invention to overcome the above mentioned disadvantages.

It is a related object of this invention to reduce the necessary size of a recording medium in the case of video disks, coiled video tapes and other recording media of the "multiply coiled recording track" type.

It is another object of this invention to reduce cost and complexity of video recording and reproducing equipment.

It is another object of this invention to improve the reliability of video recording and reproducing methods and equipment.

It is a further object of this invention to improve the quality of recorded and reproduced video presentations.

It is a further object of this invention to provide and exploit scan conversion techniques which realize the above mentioned objects.

It is a related object of this invention to provide improved video recording and reproducing methods and apparatus employing advanced scan conversion techniques.

It is a furhter object of this invention to provide improved skip field techniques.

It is a further object of this invention to provide methods and apparatus in which image fields or other video signal quanta are skipped during recording for the purpose of a reduced bandwidth, without an occurrence of corresponding empty spaces on the recording media.

It is a further object of this invention to provide advanced embodiments of scan conversion and skip field techniques and to provide improved methods and apparatus exploiting these techniques.

Other objects of this invention will become apparent in the further course of this disclosure.

From a first aspect thereof, the subject invention resides in a method of recording video information on a recording medium having a multiply coiled recording track, and subsequently displaying said video information at a display scan rate. The invention according to this aspect resides, more specifically, in an improvement for reducing the size of the recording medium relative to a size requisite for a recording at said display scan rate, comprising a combination the steps of providing signals which include said video information in a series of video signal quanta synchronized at a scan rate lower then said display scan rate, recording said signals including said video signal quanta on a recording medium at a first relative recording medium velocity and in accordance with the arithmetic progression $$u = a + (n - 1)d$$

wherein:
 u denotes the numbers of the quanta which are recorded,
 a and d are positive integers above zero, and
 n is the order of any term in the progression,
reproducing said recorded signal including said recorded video signal quanta in a reproducing operation at a second relative velocity being higher than said first velocity so that said reproduced video signal quanta are synchronized at said display scan rate, repeating in the same reproducing operation the reproduction of recorded video signal quanta at said second relative velocity, the repeated reproduction of any recorded video signal quantum in the same reproducing operation being completed before commencement of the reproduction of any recorded video signal quantum whose number in said arithmetic progression occurs more than one term after the number of the particular video signal quantum, and displaying at said display scan rate the video information containing in said reproduced video signal quanta.

In accordance with a preferred embodiment of the invention, the above mentioned signals comprising the video information in a series of video signal quanta synchronized at said lower scan rate are provided by providing signals comprising said video information in a series of image fields synchronized at said lower scan rate, said signals including said image fields are recorded on said recording medium at said first relative recording medium velocity and in accordance with the arithmetic progression $$u = a + (n - 1)d$$

wherein:
 u denotes the numbers of the image fields which are recorded,
 a and d are positive integers above zero, and
 n is the order of any term in the progression,
said recorded video signals including said recorded image fields are reproduced in a reproductive operation at a second relative velocity higher than said first velocity so that said reproduced image fields are synchronized at said display scan rate, the reproduction of recorded image fields at said second relative velocity is repeated in the same reproducing operation, the repeated reproduction of any recorded image field in the same reproducing operation being completed before commencement of the reproduction of any recorded image field whose number in said arithmetic progression occurs more than one term after the number of the particular image field, and the information contained in said reproduced image fields is displayed at said display scan rate.

From a second aspect thereof, the subject invention resides in a method of playing back video information from a recording medium having a multiply coiled recording track containing a video recording produced by a method including the steps of providing signals which include said video information in a series of video signal quanta synchronized at a scan rate lower than a predetermined display scan rate, and recording said signals including said video signal quanta on said recording medium at a first relative recording medium velocity and in accordance with the arithmetic progression $$u = a + (n - 1)d$$

wherein:
 u denotes the numbers of the quanta which are recorded,
 a and d are positive integers above zero, and
 n is the order of any term in the progression.

The invention according to the latter aspect resides, more specifically, in the improvement comprising in combination the steps of reproducing said recorded signals including said recorded video signal quanta from said video recording in a reproducing operation effected at a second relative recording medium velocity being higher than said first velocity so that said reproduced video signal quanta are synchronized at said display scan rate, repeating in the said reproducing operation the reproduction of recorded video signal quanta at said second relative velocity, the repeated reproduction of any recorded video signal quantum in the same reproducing operation being completed before commencement of the reproduction of any recorded video signal quantum whose number in said arithmetic progression occurs more than one term after the number of the particular video signal quantum, and displaying at said display scan rate the video information contained in said reproduced video signal quanta.

From a third aspect thereof, the subject invention resides in apparatus for recording video information on a recording medium having a multiply coiled recording track, and subsequently reproducing said video information at a display scan rate. The invention according to this aspect resides, more specifically, in an improvement for reducing the size of the recording medium relative to a size requisite for a recording at said display scan rate, comprising, in combination, means for providing signals comprising said video information in a series of video signal quanta synchronized at a scan rate lower than said display scan rate, means for recording said signals including said video signal quanta on said recording medium at a first relative recording medium velocity and in accordance with the arithmetic progression $$u = a + (n - 1)d$$

wherein:
 u denotes the numbers of the quanta which are recorded,
 a and d are positive integers above zero, and
 n is the order of any term in the progression, and
means for reproducing said recorded signals including said recorded video signal quanta at a second relative velocity being higher than said first velocity so that said reproduced video signal quanta are synchronized at said display scan rate, said reproducing means including means for repeating in the same reproducing operation the reproduction of recorded video signal quanta at said second relative velocity, said repeating means including means for completing the repeated reproduction of any recorded video signal quantum in the same reproducing operation before commencement of the reproduction of any recorded video signal quantum whose number in said arithmetic progression occurs more than one term after the number of the particular signal quantum.

In accordance with a preferred embodiment of this invention, said signal providing means include means for providing signals comprising said video information in a series of image frames synchronized at said lower scan rate, said recording means include means for recording said signals including said image fields on said recording medium at said first velocity and in accordance with the arithmetic progression $$u = a + (n - 1)d$$

wherein:
- $u$ denotes the numbers of the image fields which are recorded,
- $a$ and $d$ are positive integers above zero, and
- $n$ is the order of any term in the progression, and said reproducing means include means for reproducing said recorded signals including said image fields at said second velocity being higher than said first velocity so that said reproduced image fields are synchronized at said display scan rate, said repeating means include means for repeating in the same reproducing operation the reproduction of recorded image frames at said second relative velocity, said repeating means including means for completing the repeated reproduction of any recorded image field in the same reproducing operation before commencement of the reproduction of any recorded image frame whose number in said arithmetic progression occurs more than one term after the number of the particular image field.

In accordance with a fourth aspect thereof, the subject invention resides in an apparatus for playing back video information from a recording medium having a multiply coiled recording track containing a video recording produced by a method including the steps of providing signals which include said video information in a series of image fields synchronized at a scan rate lower than a predetermined display scan rate, and recording said signals including said image fields on said recording medium at a first relative recording medium velocity and in accordance with the arithmetic progression $$u = a + (n - 1)d$$

wherein
- $u$ denotes the numbers of the image fields which are recorded,
- $a$ and $d$ are positive integers above zero, and
- $n$ is the order of any term in the progression.

The invention according to this aspect resides, more specifically, in the improvement comprising, in combination, means for reproducing said recorded signals including said recorded image fields from said video recording at a second relative velocity being higher than said first velocity so that said reproduced image fields are synchronized at said display scan rate, said reproducing means including means for repeating in the same reproducing operation the reproduction of recorded image fields at said second relative velocity, said repeating means including means for completing the repeated reproduction of any recorded image fields in the same reproduction of any recorded image fields whose number in said arithmetic progression occurs more than one term after the number of the particular image field.

BRIEF DESCRIPTION OF THE DRAWINGS

The subject invention and its objects and various aspects will become more readily apparent from the following detailed description of preferred embodiments thereof, illustrated by way of example in the accompanying drawings, in which like reference numerals designate like or functionally equivalent parts, and in which:

FIG. 1 is a diagrammatic view of a video information recording apparatus in accordance with a preferred embodiment of the subject invention;

FIG. 2 is a diagrammatic view of a video information playback apparatus in accordance with the preferred embodiment of the subject invention;

FIG. 3 is a schematic showing of video information recording tape on which video information has been recorded with the apparatus of FIG. 1, and from which video information is reproduced by the apparatus of FIG. 2;

FIG. 4 is a table illustrating a playback method in accordance with a preferred embodiment of the subject invention, carried out by the apparatus of FIG. 2;

FIG. 5 is a diagrammatic illustration of a video information recording and playback apparatus in accordance with a further preferred embodiment of the subject invention;

FIG. 6 is a table illustrating a video information playback method according to a preferred embodiment of the subject invention, carried out by the apparatus of FIG. 5;

FIG. 7 is a diagrammatic illustration of a video information recording and playback apparatus in accordance with yet another preferred embodiment of the subject invention;

FIG. 8 is a table illustrating a video information playback method in accordance with a preferred embodiment of the subject invention, which may be carried out by the apparatus of FIG. 7;

FIG. 9 is a table illustrating another video information playback method in accordance with a preferred embodiment of the subject invention, which may be carried out by the apparatus of FIG. 7.

FIG. 10 is a table illustrating a skip field-type video information recording and playback method according to a preferred embodiment of the subject invention, which may be carried out with the apparatus of FIG. 7.

FIG. 11 is a diagrammatic illustration of a skip field-type video information recording and playback apparatus in accordance with a further preferred embodiment of the subject invention;

FIG. 12 is a schematic showing of a video information recording tape on which video information has been recorded by the apparatus of FIG. 11;

FIG. 13 is a schematic showing of a video information recording tape on which video information has been recorded by the apparatus of FIG. 7 and by the use of the skip field-type technique illustrated by the table of FIG. 10;

FIG. 15 is a table illustrating skip field-type video information and playback methods in accordance with further preferred embodiments of the subject invention, which may be carried out by the apparatus of FIG. 11 or FIGS. 11 and 14;

FIG. 17 is a block diagram of equipment that may be employed in conjunction with the apparatus of FIG. 7 in a skip field-type recording mode;

DESCRIPTION OF PREFERRED EMBODIMENTS

Figure 14:
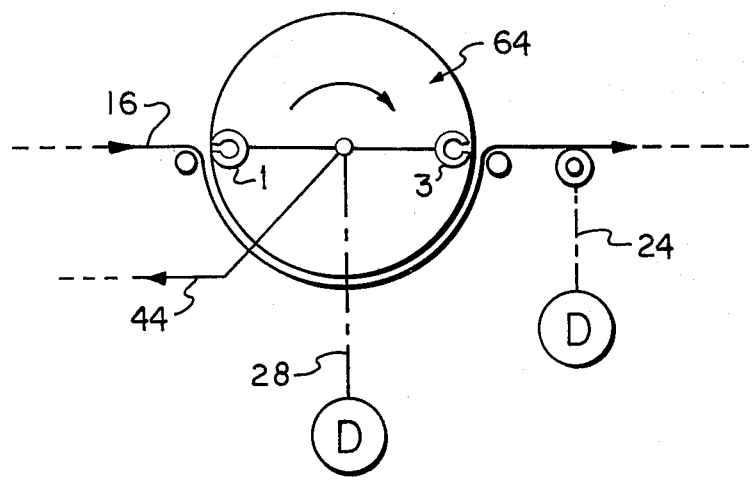
FIG. 14 is a diagrammatic illustration of a video information playback apparatus in accordance with a preferred embodiment of the subject invention, which may be used in conjunction with the apparatus of FIG. 11.

The video information recording apparatus 10 of the preferred embodiment of the subject invention illustrated in FIG. 1 has a video camera for providing signals comprising the video information in a series of video signal quanta synchronized at a scan rate which is lower than a display scan rate. The display scan rate is the scan rate at which recorded video information will be displayed after reproduction or playback thereof. The video camera 12 as well as its synchronization equipment 13 may be of conventional construction and design. In particular, the synchronization equipment 13 may be designed in a conventional manner so that it synchronizes the camera 12 at the named lower scan rate. The lower scan rate provided for the camera 12 may bear the same relationship to the display scan rate as the relative recording speed bears to the relative playback speed, to be described below. For instance, if the playback speed is equal to twice the recording speed, then the lower scan rate provided for the camera may be equal to one-half the display scan rate.

The apparatus 10 of FIG. 11 also has a linear recording machine 14 having at least one recorded head 1. Magnetic recording tape 16 is derived from a supply coil 16' and is guided with the aid of two rollers 17 and 18 around one half of a drum 19. The tape 16 is thus provided in a 180° wrap. During and after recording the recording tape 16 is wound unto a further coil 16''.

While FIGS. 1, 2, 3, 5, 7, 11, 12, 13, 14 and 16 are based on the use of magnetic video recording tape of a conventional type, it should be understood that the subject invention is not limited to magnetic video tape recording, as other video recording techniques, including video disc recording, are well known in the art.

In the preferred embodiment of FIG. 1 and in most of the other illustrated embodiments, only a single recording device or head 1 is used to record the information synchronized at the lower scan rate. Also, that single recording device is typically maintained stationary during the recording operation, as long as no skip field technique is employed.

Accordingly, a motion arresting device 21 is symbolically shown to indicate that the recording head 1 is maintained stationary. In some applications it may be advantageous to employ recording heads which are different from the heads which are used during playback of the recorded information. For instance, the information may be recorded with a head which has a wider gap than the heads used for a playback of the recorded information.

If different heads and different machines are used for recording and for playback, then the recording machine may be an ordinary type of linear recorder in which the recording tape is moved past a stationary recording head in a straight path. On the other hand, FIG. 1 illustrates an embodiment in which a second head 2 is provided at the drum 19, but is not employed in the recording operation.

The video signals provided by the camera 12 and synchronized at the lower scan rate are applied by a lead 23 to the recording head 1. Since the head 1 is maintained stationary during recording, it follows that the video signals are recorded on the recording tape 16 at a first relative velocity which is equal to the tape velocity imposed on the recording tape 16 by a tape drive 24. The tape drive 24 may be of a conventional type which drives the tape with a very high precision.

The recording machine 14 records the video signals including the video signal quanta received from the camera 12 on the recording tape 16 in accordance with the arithmetic progression $$u = a + (n - 1)d$$

wherein:
- $u$ denotes the number of the quanta which are recorded,
- $a$ and $d$ are positive integers above zero, and
- $n$ is the order of any term of the progression.

With the recording head 1 being maintained stationary and with the apparatus 10 illustrated in FIG. 1 lacking equipment for skipping or suppressing image fields or other video signal quanta, it follows that the positive integer $d$ in the case of FIG. 1 is equal to one (1). Since no zero image fields or other zero video signal quanta occur in practice, it follows that the positive integer $a$ has to be at least equal to one (1). In practice, this means that the first image field or other video signal quantum in a series is recorded. This is, of course, a matter of definition under which the field or quantum which is first recorded is designated as the first field or quantum.

The integer $n$ in the arithmetic progression designates the order of any term in that progression. For instance, $n$ is one (1) for the first term, two (2) for the second term, three (3) for the third term, and so forth.

If $d$ is one (1) as in the case of FIG. 1, then $u$ becomes 1, 2, 3, 4, 5, et seq. This means that every image field or video signal quanta is recorded on the tape 16. The term "video signal quanta" as herein employed refers to any recurring portion of the video signal which contains video information. For instance, horizontal lines may be video signal quanta. On the other hand, image fields may be video signal quanta. By way of further example, the video signal quanta may be image frames composed of pairs of interlaced image fields. In some instances, horizontal image lines, the image fields and the image frames are all synchronized at the lower scan rate so that all three of these entities qualify for the term "video signal quanta". In other instances, recurring portions of the video signal may be skipped or suppressed prior to reporting so that only the recorded part of the video signal may qualify for the term "recorded video signal quanta". For instance, in a skip field technique one field of each frame may be skipped or suppressed so that only the remaining fields qualify for the term "recorded video signal quanta".

As seen in FIG. 3, every one of the fields number 1, 2, 3, 4 and 5 is recorded on the tape 16 by the recorder 14. Of course, each recorded field contains not only the video information seen by the camera 12, but also the requisite horizontal and vertical synchronization pulses which may be provided in a conventional manner by the synchronization equipment 13.

According to FIG. 2, the video information is reproduced directly from the tape 16 onto which it was recorded. This is, indeed, often the case in practice where the video information is recorded and reproduced on and from the same recording tape. However, it is also within the scope of the subject invention that the video information recorded on the tape 16 be copied onto another tape (not shown) from which the recorded information is subsequently reproduced. The copying of video recording tapes is well known as may be seen from the following United States patents which are herewith incorporated by reference herein: U.S. Pat. No. 2,738,383, by R. Herr et al., issued Mar. 13, 1956, U.S. Pat. No. 3,465,105, by Akio Kumada et al., issued Sept. 2, 1969, U.S. Pat. No. 3,541,577, by J. U. Lemke, issued Nov. 17, 1970, and 3,613,102, by N. B. Daly et al., issued Oct. 12, 1971.

The playback apparatus 26 has the above mentioned drum 19 about which the tape 16 is guided with the aid of rollers 17 and 18. In contrast to the recording apparatus of FIG. 1, the heads 1 and 2 are rotated by a drive 28.

The tape drive 24 and the head drive 28 need to be in exact synchronism during their operation to prevent the recording heads from being off tape when they are supposed to pick up recorded signals and to prevent the recording heads from repeatedly commencing reproduction of recorded image fields at instances other than the field beginnings. Also, the head-to-tape velocity has to be kept within very narrow tolerances to preserve the desired playback scan rate and to inhibit flutter and other timebase errors as would be caused by irregularities in the head-to-tape velocity.

The problem presently under discussion is not unique to the systems of the subject invention and has in principle been solved in the art of video tape recording with rotating heads. Accordingly, only a simplified block diagram is shown in FIG. 16 of a suitable position and velocity servo system that may be employed in the practice of the subject invention with respect to the playback equipment herein disclosed as well as with respect to recording equipment of the type disclosed below with rotating heads.

Figure 16:
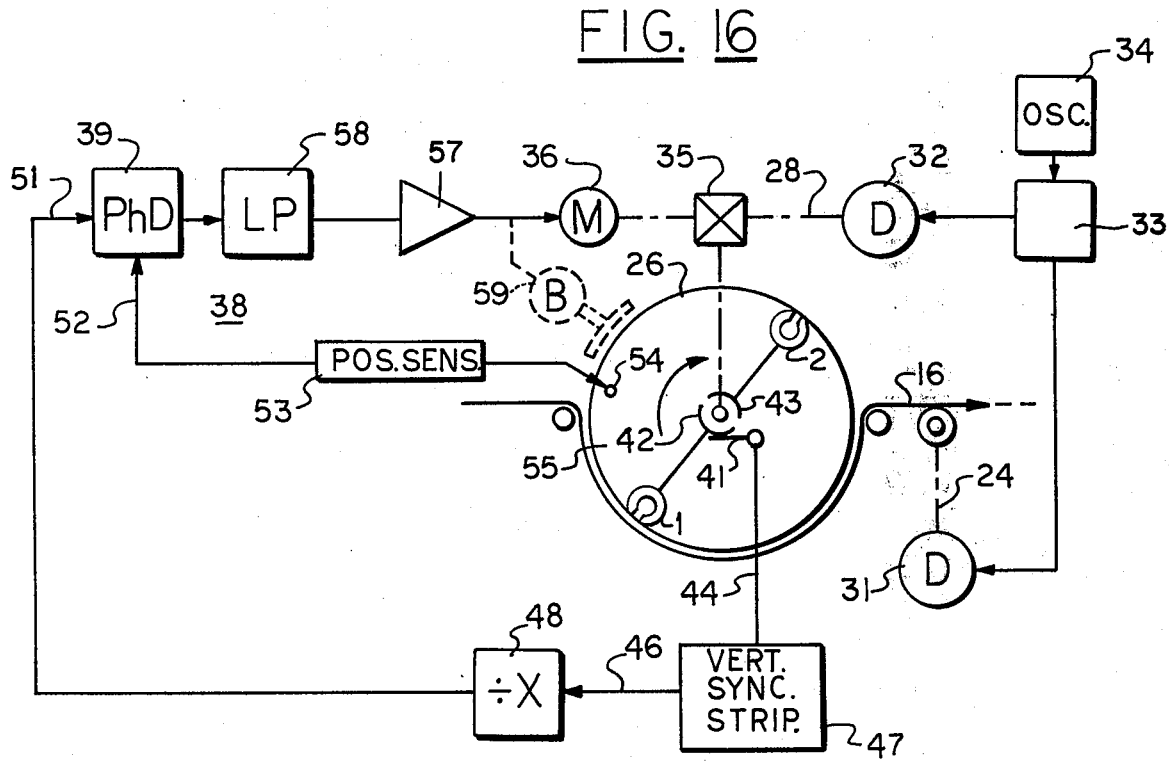
FIG. 16 is a diagrammatic illustration of a servo system that may be employed in video information recording and playback equipment herein disclosed.

According to FIG. 16, the tape drive 24 and the head drive 28 include synchronous electric motors 31 and 32 which are energized by a conventional oscillator-controlled alternating-current power source 33. A crystal oscillator 34 may be employed to control the power source 33.

The synchronous motor 32 may be employed to drive the heads 1 and 2 through a high-precision differential gear 35. A servo motor 36 may then be employed to correct position and velocity errors of the rotating heads by way of the differential gear 35.

The servo motor 36 is part of a closed-loop servo system 38 which includes a phase detector 39. In FIG. 16, as well as in FIG. 2, a brush 41 and commutator segments 42 and 43 are employed to pick up the electric signals generated by the rotating playback heads 1 and 2 and to apply these signals to a lead 44. In instances where mechanical commutator arrangements are not practically feasible or where an electronic solution is desired, circular slip rings cooperating with an electronic gating system of the type disclosed in FIG. 7 may be employed. In FIG. 16, the vertical sync pulses are stripped from the reproduced video signal occurring in the lead 44 and are applied to a lead 46. Conventional sync stripper equipment 47 may be employed for this purpose. A digital counter 48 divides the vertical sync pulses by a given factor so that the frequency or repetition rate of the resulting signal occurring at the input 51 of the phase detector 39 is equal to the frequency or repetition rate of the signal occurring at the second input 52 of the phase detector 39 when position and velocity synchronism has been achieved.

The signal which is applied to the input 52 of the phase detector 39 is generated by a position sensor 53 that may be of a conventional type. By way of example, a familiar type of position sensor employs an aperture, indicated at 54, in a disc 55 on which the heads 1 and 2 are mounted and which is rotated by the drive 28 for the desired rotation of the playback heads. The position sensor 53 then employs a photocell (not shown) which senses a light source (not shown) through the aperture 54 each time this aperture is in alignment with the light source and the photocell.

In a conventional manner, the output signal of the phase detector 39 is employed to a servo amplifier by way of a loop filter (low-pass filter) 58. The servo amplifier 57 energizes the servo motor 36 which may, for instance, be of a permanent magnet field type which has a polarity sensitive sense of rotation.

Instead of the mechanical solution employing the differential gear 35, a conventional type of electronic motor control system could be used for varying the speed of rotation of the head drive. On the other hand, it is in some instances possible to employ an electrically operated break 59 instead of the differential gear 35 and servo motor 36. Systems of this type, which are in use in commercially available slant-track recorders, employ a head drive which rotates the heads at a slightly faster rate than the rate normally required. The break is then slightly applied during normal operation so as to cause rotation of the head at nominal speed. If the head velocity becomes successive, the break is applied stronger. For increased head velocity, the break is somewhat lifted.

Since the playback heads are rotated against the tape in the playback apparatus of FIG. 2, whilst the recording head was mainained stationary in the recording apparatus of FIG. 1, it follows that the recorded signal including the recorded image fields are reproduced at a second relative velocity (head-to-tape velocity) which is higher than the first velocity at which the signals were recorded. Where, as in FIG. 1, the recorded signals were synchronized at a lower scan rate than the display scan rate, the second relative velocity provided during playback bears such a relationship to the first relative velocity during recording that the reproduced video signal occurring in the lead 44 is synchronized at the desired display scan rate. The played-back video signals are then applied to, and displayed by, conventional video display equipment 61, with the aid of conventional synchronization equipment 62 which responds to the sync pulses in the reproduced video signal. If desired, the played-back video signals may be modulated on a carrier so as to be applicable to antenna terminals of conventional television receivers.

In accordance with an important aspect of the subject invention, the reproduction of recorded image fields at the mentioned second relative velocity is repeated in the same reproducing operation. This is to be clearly distinguished from prior-art situations in which the same video program is reproduced over and over. Of course, if a video program is reproduced two or more times, it can also be said that the reproduction of recorded image fields is repeated. However, in accordance with the aspect of the present invention under discussion, the reproduction of image frames is repeated in the same reproducing operation, rather than merely in a subsequent running of the tape 16. Also, the repeated reproduction of any recorded image field in the same reproducing operation is completed before commencement of the reproduction of any recorded image field whose number in the above mentioned arithmetic progression occurs more than one term after the number of the particular image field.

The latter requirement according to the subject invention will now be explained with the aid of FIG. 4. The left-hand column of the table of FIG. 4 lists the playback heads 1 and 2 by number. The center column lists the number of the fields (see FIG. 3) that are being reproduced by a given head. The right-hand column lists the number of the image frames that are being reproduced. In this respect it will be recalled that each image frame consists of two interlaced image fields. The first frame is thus composed of the first and second fields. The second frame is composed of the third and fourth fields. The third frame is composed of the fifth and sixth fields, and so forth.

In the preferred embodiment shown in FIG. 2, the head speed is equal to the tape speed. Since the heads rotate against the tape, it may be said that $V_H = -V_T$; wherein $V_H$ is the head velocity and minus $V_T$ is the tape velocity. In this case, the scan conversion factor is two, since the head-to-tape velocity upon playback is twice the head-to-tape velocity during recording. The scan rate of the signal reproduced by the camera 12 in FIG. 1 is then equal to one-half the display scan rate of the signal reproduced in FIG. 2.

Examining FIG. 4, we find that the head 1 reproduced the recorded first and second image fields in sequence. The head 2 then again reproduces the recorded first and second fields in sequence. The head 2 thereupon reproduced the recorded third and fourth fields in sequence, and the head 1 thereafter again reproduces the recorded third and fourth fields in sequence. The same pattern of reproduction is followed in the further course of the reproducing operation, with the next reproduced field being the field 5 which is played back by the head 1 as shown at the bottom of FIG. 4. In this manner, each field is reproduced twice and each frame is reproduced twice, as shown in FIG. 4.

It may thus be said that each field (or in the instant case also each frame) is reproduced $m$ times, wherein $m$ is the quotient of the second and first relative velocities (head-to-tape velocities). In the above mentioned arithmetic progression, the second image field occurs in the term after the first image field. The third image field occurs in the term after the second image field. Similarly, the fourth image field occurs in the term after the third image field and the fifth image field occurs in the term after the fourth image field. This is the case when the above mentioned positive integers $a$ and $d$ are equal to one (1).

Reverting now to the above mentioned statement about the repeated reproduction of any recorded image field, it will be noted from FIG. 4 that the reproduction of the first and second image fields is completed before commencement of the reproduction of the third image field. Similarly, the repeated reproduction of the third and fourth image fields are completed before commencement of the reproduction of the fifth image field, and so forth. The reproducing mode represented by the table of FIG. 4 is thus within the inventive requirement that the repeated reproduction of any recorded video signal quantum in the same reproducing operation is completed before commencement of the reproduction of any recorded video signal quantum whose number in the arithmetic progession mentioned above occurs more than one term after the number of particular video signal quantum. In practice, this is a critical limitation whose violation results in an untenable waste of the available recording bandwidth.

The table of FIG. 4 also displays a further feature pursuant to a preferred embodiment of the subject invention. According to this special feature, the reproduction of each recorded image field takes place after the reproduction of an immediately adjacent image field in the above mentioned arithmetic progression. For instance, as seen in FIG. 4, the reproduction of the first image field is repeated after the reproduction of the second image field. The reproduction of the second image field is repeated after the reproduction of the first image field. The reproduction of the third image field is repeated after the reproduction of the fourth field, and the reproduction of the fourth image field is repeated after the reproduction of the third image field. In this manner, each frame is reproduced twice as a complete frame.

A further preferred embodiment of the subject invention is shown in FIG. 5.

According to FIG. 5, a recording and playback apparatus 64 has four heads 1, 2, 3 and 4. The heads are angularly displaced from each other by an angle of 90°. In addition to the segments 42 and 43, the apparatus 74 has segments 65 and 66 for the heads 3 and 4. The segments 42, 43, 65 and 66 thus serve to apply the reproduced video signals from the heads 1, 2, 3 and 4 to the brush 41 and thence to the display device (see FIG. 2) by way of the lead 44.

During recording, the head 1 of the apparatus shown in FIG. 5 is held stationary as indicated at 21. The tape is advanced along a 90° wrap about the drum 19 by the tape drive 24.

The reduced scan rate video signals generated by the camera 12 (see FIG. 1) are applied by the stationary recording head 1 by way of the lead 23, brush 41 and commutator segment 42. The first, second, third, fourth, fifth, et seq., image fields are thus recorded in succession onto the tape 16 at the above mentioned first relative velocity.

The blocking 21 of the head 1 is removed for playback and the head drive 28 is energized in the above mentioned manner to rotate the heads against the tape. By way of example, the head speed may be equal to the tape speed ($V_H = -V_T$). In that case, the scan conversion between recording and playback proceeds by a factor of two. Also, the playback proceeds in accordance with a table of FIG. 6. In accordance with that table, the heads 1 and 2 take turns in reproducing the first field twice. The heads 2 and 3 then take turns in reproducing the second field twice. The heads 3 and 4 then cooperate in reproducing the third field twice. The heads 4 and 1 then reproduce the fourth field twice in succession, and so forth, with the fifth field being the next field reproduced by the head 1.

FIG. 6 illustrates a further preferred embodiment of the subject invention according to which the repeated reproduction of any recorded field in the same reproducing operation is completed before the commencement of the reproduction of any further recorded image field. This has the considerable advantage of an immediate compensation for the reduced recording bandwidth. While the video information is generated at a reduced scan rate (see camera 12) and is recorded at a reduced bandwidth (see stationary recording head 1), the reproduction of each image frame is repeated to compensate for the reduced original scan rate and reduced recording bandwith to a considerable extent.

A video recording and playback apparatus in accordance with a further preferred embodiment of the subject invention will now be disclosed with the aid of FIG. 7.

According to FIG. 7, three recording heads 1, 2 and 3 are displaced from each other by angles of 120°. Three brushes 72, 73 and 74 and three slip rings 76, 77 and 78 cooperate in feeding signals to and from the heads 1, 2 and 3 respectively.

For recording, the above mentioned reduced scan rate camera 12 is connected to the head 1 by way of the lead 23, a double-throw switch 81, a double-throw switch 82, the brush 72 and the slip ring 76. The first, second, third, fourth, fifth, et seq., frames are thus recorded on the tape 16 in the manner generally shown in FIG. 3.

For playback, the tape drive 24 advances the tape 16 in a 180° wrap about the drum 19. The heads 1, 2 and 3 are rotated against the tape by the drive 28.

Three gates 81', 82' and 83' are employed for a sequential application of the reproduced signals to the display equipment 61 and synchronization equipment 62 (see FIG. 2) by way of the lead 44. The gates 81' to 83' are sequentially operated by a sequencer 85 which is energized by vertical synchronization pulses provided by a vertical sync stripper 86 that is connected to the lead 44. The gating system of FIG. 7 may be implemented with prior-art equipment, such as with the type of signal processing apparatus and systems shown in the U.S. Pat. No. 3,512,008, by B. H. Dann, and 3,512,094, by B. H. Dann et al, both issued on May 12, 1970 and both incorporated by reference herein.

The function of the gates 81' to 83' and sequencer 85 is further explained with the aid of the tables of FIGS. 8 and 9. According to FIG. 8, the head velocity during playback is again equal to minus the tape velocity for a 2:1 scan conversion during playback. The heads 1 and 2 first take turns in reproducing the first field. The heads 2 and 3 then take turns in reproducing the second field. The heads 3 and 1 then cooperate in reproducing the third field, and so forth. Each vertical sync signal from the stripper 86 causes the sequencer 85 to switch on the next gate in sequence. During playback, the switches 81 and 82 are, of course, in their second position illustrated in dotted outline in FIG. 7. The switch 81 then grounds the unused lead between switches 81 and 82. The switch 81 may be replaced by a solid lead if the unused lead between the switches 81 and 82 does not cause interference with the then used part of the equipment.

For a 4:1 scan conversion, the heads 1 to 3 are rotated at trice the speed of the tape 16 during playback. In that case, the camera 12 may be operated at one-fourth the display scan rate of the display equipment 61 (see FIG. 2).

The latter mode of operation may be designated by the equation $V_H = -3V_T$, as indicated in FIG. 9.

As also indicated in FIG. 9, the heads 1, 2, 3 and 1 first take turns in reproducing the first field four times. The same heads then take turns in reproducing the second field four times. The same heads thereafter take turns in reproducing the third field four times, and so forth. Again, each recorded image field is reproduced m times wherein m is the quotient of the second and first relative velocities (head-to-tape recording and playback velocities).

The tables 8 and 9 represent another case in which the repeated reproduction of any recorded image field in the same reproduction operation is completed before commencement of the reproduction of any further recorded image field. The solution according to FIG. 9 trades some fast-action reproduction capability for a reduced bandwidth. Undue flicker is avoided by a stepped-up repetition of the image field reproduction.

As illustrated with the aid of the table shown in FIG. 10, the equipment of FIG. 7 may be employed for carrying out a skip-field technique. Skip-field techniques as such are well known and are frequently employed in prior-art equipment for bandwidth limiting purposes. In accordance with this aspect of the subject invention, skip-field techniques are carried out by using as the factor d in the above mentioned arithmetic progression a positive integer which is greater than one. For instance, if the above mentioned positive integer is two (2), then only the odd fields are recorded on the tape 16.

In accordance with the preferred embodiment illustrated in FIG. 10, the factor d in the above mentioned arithmetic progression is made equal to four (4). In that case, only the first, fifth, ninth, thirteenth, et seq., fields are recorded on the tape 16. To this end, the heads 1 to 3 are rotated by the drive 28 so that the head velocity is equal to minus three times the tape velocity ($V_H = -3V_T$). As before, only the head 1 is energized during recording by the signal generated by the camera 12 and applied to the head 1 by way of the lead 23, switches 81 and 82, brush 72 and slip ring 76.

The head 1 is first caused to record the first field on the tape 16. The head 1 then moves off the tape. If a 90° wrap is used for the tape 16 in the apparatus of FIG. 7 during recording, then the head 1 only moves back onto the tape 16 during occurrence of the fifth image field. Similarly, the head 1 then moves off the recording tape and only moves back onto the recording tape during occurrence of the thirteenth image field. Accordingly, only the first, fifth, ninth, thirteenth, et seq., fields are recorded on the tape 16.

It should be understood at this juncture that the skip field techniques herein disclosed are not limited to the recording of signals received directly from a video camera. Rather, the skip field techniques herein disclosed may advantageously be employed for recordng video signals received from a broadcast or other wireless or cable communication. Also, these skip field techniques herein disclosed may be employed to record video signals received from a video camera that is operated at the same scan rate as the device with which the video information is being displayed upon reproduction of the recorded video signals.

FIG. 17 diagrammatically shows equipment for providing the apparatus of FIG. 7 with video information that is recorded with the aid of a skip field technique.

According to FIG. 17, a television receiver 91, which may be of a conventional type, is employed to provide at a lead 92 video information that has been broadcast or otherwise communicated in a conventional manner by a wireless or cable transmission. A vertical sync stripper 93, which may be of a conventional type, separates the vertical sync signals from the received video information and applies these vertical sync signals by way of a lead 94 to a counter of four 95 which, in a conventional manner, divides the number of vertical sync signals by a factor of four. The result of this division is a pulse train which is applied by a lead 97 to a delay device 98 and by a lead 99 to one input of a logic AND-element 100.

The delay device 98 includes conventional components for delaying the pulse train received from the counter 95 by the duration of one image field in the video information received by the television receiver 91. A conventional inverter 102 inverts the pulse train delayed by the device 98 and applies the inverted pulse train to the other input of the AND-element 100. As its name implies, the AND-element 100 provides only an output at a lead 104 when both of its inputs are energized.

In consequence of the operation of the components of the circuit of FIG. 17 so far discussed, a gate 105 receives a gating signal by way of the lead 104 only every fourth image frame after the first image frame. Accordingly, the gate 105 only gates the first, fifth, ninth, thirteenth, et seq., image frames from the receiver 91 and lead 92 to a lead 107. The gated image fields are applied to the rotating recording head 1 by way of the previously disclosed switch 82, brush 72 and slip ring 76. In accordance with a table shown in FIG. 10, the head 1 is rotated at a velocity equal to minus three times the tape velocity ($V_H = -3V_T$).

FIG. 13 symbolically illustrates the image fields recorded on the tape 16 by the skip field recording techniques represented in FIG. 10. As an important, it will be noted that these and other skip field recording techniques herein disclosed provide linear recordings in which the spacings between adjacent linearly recorded signal quanta or image fields are shorter than the length of a recorded image quantum or image field. In fact, the image fields recorded with skip field techniques according to the subject invention are typically present on the tape 16 without significant spaces remaining therebetween.

A reproduction or replay of video information which has been recorded as shown in FIG. 13 will now be described. For this purpose, the equipment shown in FIG. 7 may again be employed. As a result, and as shown in FIG. 10, the heads 1, 2, 3 and 1 take turns in replaying the first recorded field. The same heads then take turns in replaying the next recorded field, which is the fifth image field. Thereafter, the same heads take turns in replaying the next recorded field, which is the ninth image field, and so forth until all recorded fields have been replayed. The replayed fields are displayed by the display device 61 (see FIG. 2) as before.

Reviewing the table of FIG. 10, it will be noted that, in accordance with a preferred embodiment of the subject invention, each recorded image field is reproduced $d$ times, wherein $d$ is the above mentioned positive integer and, in the case of a skip field technique, is greater than one.

Further equipment for carrying out a skip field linear recording technique according to a preferred embodiment of the subject invention is shown in FIG. 11.

According to FIG. 11, broadcast or otherwise communicated video signals are received by a television receiver 91 and applied to the lead 92. A vertical sync stripper applies the vertical sync signals from the received signal to a lead 94. A counter of two 112 provides a pulse train in which the number of vertical sync signals is divided by two. This pulse train actuates the gate 105 so that only every odd image field is applied from the receiver 91 by way of the lead 107 simultaneously to the four heads of the linear tape recording apparatus 64. The resulting record is shown in FIG. 12 and is also illustrated in the left-hand column of FIG. 15.

As indicated in FIG. 15, the above mentioned factor $d$ is two, so that only every odd image field is recorded, as shown in FIG. 12. The heads 1, 2, 3, 4 and 1 take turns in recording the first, third, fifth, seventh, ninth, et seq., image fields on the tape 16.

The center column of FIG. 15 illustrates playback with the type of four-head apparatus shown in FIG. 11. Each recorded field is reproduced twice. The double reproduction of each recorded field is completed before any reproduction of the next recorded field is commenced.

FIG. 14 and the right-hand column of FIG. 15 illustrate playback of the information recorded as shown in FIG. 12 with a machine 64 having a 180° wrap. The machine of FIG. 14 may be thought of as a two-head machine or then as a four-head machine having the heads 2 and 4 deactivated.

As seen in the right-hand column of FIG. 15, two adjacent recorded fields are reproduced in turn and such reproduction is thereupon repeated. The repeated reproduction of any recorded image field is being completed before commencement of the reproduction of any recorded image field whose number in the above mentioned arithmetic progression occurs more than one term after the number of the particular image field.

Whether the equipment of FIG. 11 or the equipment of FIG. 14 is used, the reproduced video signals are applied by way of the lead 44 to the display device 61 (see FIG. 2) for a display of the reproduced video information.

Figure 18:
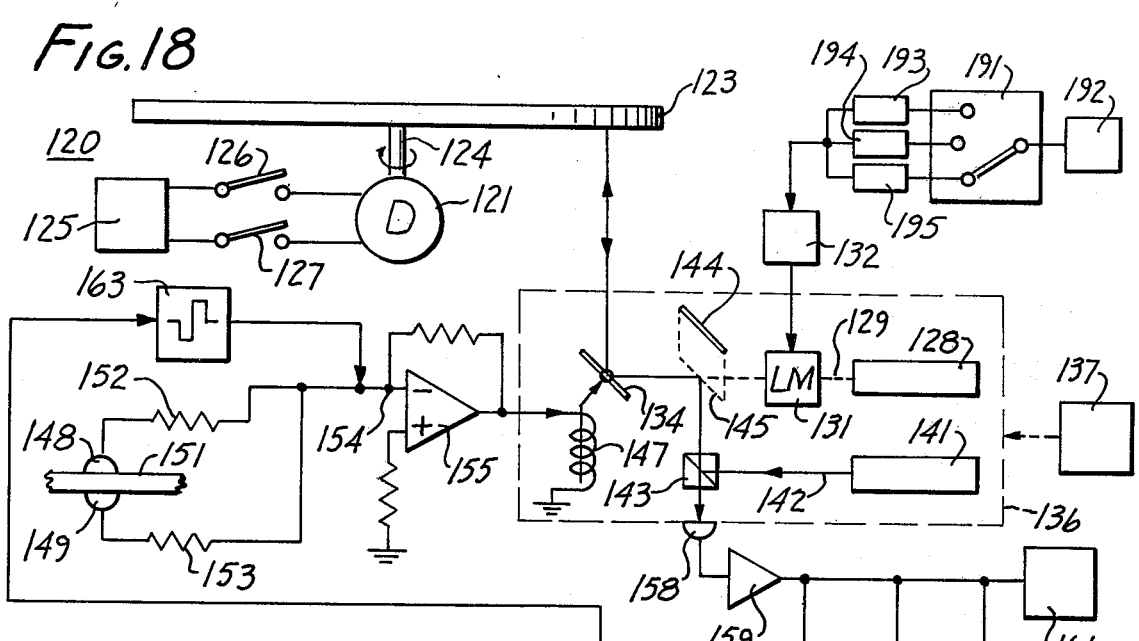
FIG. 18 is a diagrammatic view of video disk recording and playback equipment.

Several video disk embodiments of the methods and apparatus of the subject invention will now be disclosed with the aid of FIGS. 18 et seq.

In particular, FIG. 18 shows video disk recording and playback equipment 120 having a drive 121 for rotating a video disk 123 via a drive shaft 124. The drive 121 is energized from a power source 125 and is of a dual speed type, driving the video disk 123 at a first speed upon closure of a switch 126, and alternatively at a second, higher speed upon closure of a switch 127. The power source 125 may include a conventional control (not shown) for maintaining the velocity of the video disk 123 with a high precision. Controls of this type are well known in the field of magnetic tape recording, where the velocity of the recording tape is kept within extremely narrow tolerances, and also in the field of video disk recording and playback.

Several photographic, thermal and other methods have become known for recording video information on a video disk master, and no limitation of the invention to any of these techniques is intended herein. By way of example, the recording equipment 120 may include a laser 128 which produces a strong beam of collimated light 129 which is modulated by a light modulator 131 with video signals derived from a video signal source 132 and to be recorded on the video disk 123. The video signal source 132 may, for instance, include a video camera 12 with synchronizing equipment 13 (see FIG. 1) or a television receiver 91 (see FIG. 11). Alternatively, the video signal source 132 may include a film scanner, which derives video information from motion picture film and similar pictorial recording media. Film scanners are well known in the field of video recording and video signal generation.

The modulated laser beam is reflected by a mirror 132 onto the rotating disk 123. For recording purposes, this disk may be a master disk of a photosensitive, thermally responsive or other known type. At this juncture, and in connection with the video disk recording and playback methods and apparatus herein disclosed, reference may be had to the following U.S. patents which are herewith incorporated by reference herein: U.S. Pat. No. 3,501,586, entitled Analog To Digital To Optical Photographic Recording and Playback System, by J. T. Russell, issued March 17, 1970, U.S. Pat. No. 3,381,086, entitled Reproduction of Television Signals from Photographic Disc Recordings, by D. L. De Moss et al., issued Apr. 30, 1968, and U.S. Pat. No. 3,833,769, entitled Apparatus for Positional Control of a Reading Head in a Device for Reproducing Optically Coded Video Disk Recordings, by Klass Compaan et al., issued Sept. 3, 1974.

Reference may also be had to the following Belgian patents by N. V. Philips' Gloeilampenfabrieken, disclosing further video disk and sound recording methods and equipment: 780,146, issued Sept. 4, 1972, 780,451, issued Sept. 11, 1972, 780,452, issued Sept. 11, 1972, and 781,018, issued Sept. 21, 1972.

Further disclosures of video disk recording methods, apparatus and media are contained in the Philips Technical Review, Vol. 33, No. 7, 1973, pp. 178 through 193, containing the following articles: "The Philips 'VLP' system" by K. Compaan et al., "Signal processing in the Philips 'VLP' system", by W. van den Bussche et al, "The optical scanning system of the Philips 'VLP' record player", by G. Bouwhuis et al, and "Control mechanisms in the Philips 'VLP' record player", by P. J. M. Janssen et al.

The laser 128, with light modulator 131 and mirror 134 are mounted on a carriage 136 which is advanced by a conventional drive 137 in a radial direction relative to the disk 123. This carriage advance may be continuous, so as to provide a multiply coiled recording track in the form of a spiral, or incrementally, to provide multiply coiled recording tracks in the form of concentric circles.

In principle, the playback may take place from the same disk on which the recording has been effected. However, it will be more typical, especially in a commercial situation, that the recorded disk will be employed as a master to manufacture a multitude of video disks for the consumer market or for other purposes. The term "recording" as herein employed extends not only to the recording process itself, but also to the transfer of recorded information onto the disk or disks from which reproduction is to take place. For the sake of simplicity, the reference numeral 123 has been employed in the drawings to designate both master and copy disks.

In principle, the same laser may be employed for recording and playback purposes. However, a further laser 141 is shown in FIG. 18 for generating a reading beam 142 which is reflected via a beam splitter 143, a mirror 144 and the mirror 134 onto the track of a previously manufactured video information record on the disk 123. For reading purposes, the mirror 144 is advanced from the solidly illustrated rest position to the active position shown by the dotted line 145 in FIG. 18.

In reality, the laser 141, beam splitter 143 and mirror 144 may be located in the same perpendicular plane to the surface of the sheet on which FIG. 18 is drawn as the laser 128 and the mirror 134, as illustrated in FIG. 2 of the above mentioned article entitled "The Philips 'VLP' system" on page 180.

In either case, the laser 141, beam splitter 143 and mirror 144 are also mounted on the carriage 136 which is again advanced by the drive 137 so that the reading beam follows the recording track on the disk 123.

Conventional equipment may be employed to ascertain that the reading beam follows exactly the recording track. To this end, the mirror 134 may be pivoted and may be tilted about its pivot point by a piezoelectric or electromagnetic drive 147 so as to maintain the reading beam at all times on the recording track. By way of example, an auxiliary laser beam may be employed to scan the recording track and to provide a luminous signal indicating deviations of the reading beam from the track. Since such auxiliary equipment may be conventional, it has not specifically been illustrated in FIG. 18. However, a pair of photoelectric detectors 148 and 149 are shown in FIG. 18 as being alternatively energized by a luminous image 151 of the recording track whenever the reading beam deviates therefrom. The signals thus generated by the photoelectric detectors 148 and 149 proceed via resistors 152 and 153, respectively, to an input 154 of an operational amplifier 155, where they oppose each other. The operational amplifier 155 energizes the mirror drive 147 in response to the net signal of the photoelectric detectors 148 and 149 so as to keep both reading beam and auxiliary beam on the recording track of the video disk 123.

As an alternative solution, the recording tracks on the video disk may have the form of concentric rings and the drive 137 may be incremental, whereby the reading beam will stay on a track for repeated scanning thereof until the mirror 134 is energized to advance the reading beam to the next track.

The reading beam projected by the laser 141 is modulated at the recording track in accordance with the recorded video information, and is reflected via the mirrors 134 and 144 and the beam splitter 143 onto a photoelectric detector 158 which may also be of a conventional type. The latter detector reproduces the video information picked up by the reading beam and a video amplifier 159 cooperates with the photodetector to provide video equipment 161 with the reproduced video information for a display thereof, such as by the video receiver or display apparatus 61 (see FIG. 2).

In accordance with principles of the subject invention, recording of the video signals on the disk takes place at a first relative recording medium velocity, while reproduction of recorded video signals from the disk takes place at the above mentioned higher second relative velocity. To this end, the switch 126 shown in FIG. 18 may be closed for recording, whereby the drive 121 rotates the disk at a first speed, and the switch 127 may be closed during playback whereby the drive 121 rotates the disk at a higher second speed, as mentioned above. By way of example, the speed of rotation of the disk prevailing during reproduction of the video signals may be equal to m times the speed of rotation of the disk during recording, wherein m is equal to the number of times that each image field or other video signal quantum is reproduced in the same operation during playback.

For instance, the ratio between playback and recording speeds would be equal to two if each image field is reproduced twice in succession, while this ratio would be equal to three if each image field is reproduced three times in succession.

If desired, conventional technology may be employed to cause the reading beam to remain on a given track during more than one revolution so as to effect repeated reproduction of one and the same image field within the scope of the subject invention. For instance, the technique described on page 192 and shown in FIGS. 5 and 6 of the above mentioned Philips Technical Review article entitled "Control mechanisms in the Philips 'VLP' record player" may be employed to cause the mirror 134 to return the reading beam from one end of one revolution track spiral to the beginning of that one revolution for a repeated scanning of that portion of the recording track. As explained in the latter article, a pulse doublet, as produced by a conventional doublet generator 163 may be employed for this purpose, such as by momentary application to the input 134 of the operational amplifier 155, whereby the control of the photoelectric detectors 148 and 149 will be temporarily removed from the drive of the mirror 134, as I have explained in great detail in my U.S. Pat. No. 3,677,626, issued July 18, 1972 and herewith incorporated by reference herein.

In similarity to the system of the latter U.S. patent, the doublet generator 163 is driven by a control 165 when a flyback motion of the mirror 134 for a jumping of the reading beam from to another track portion is desired.

Figure 19:
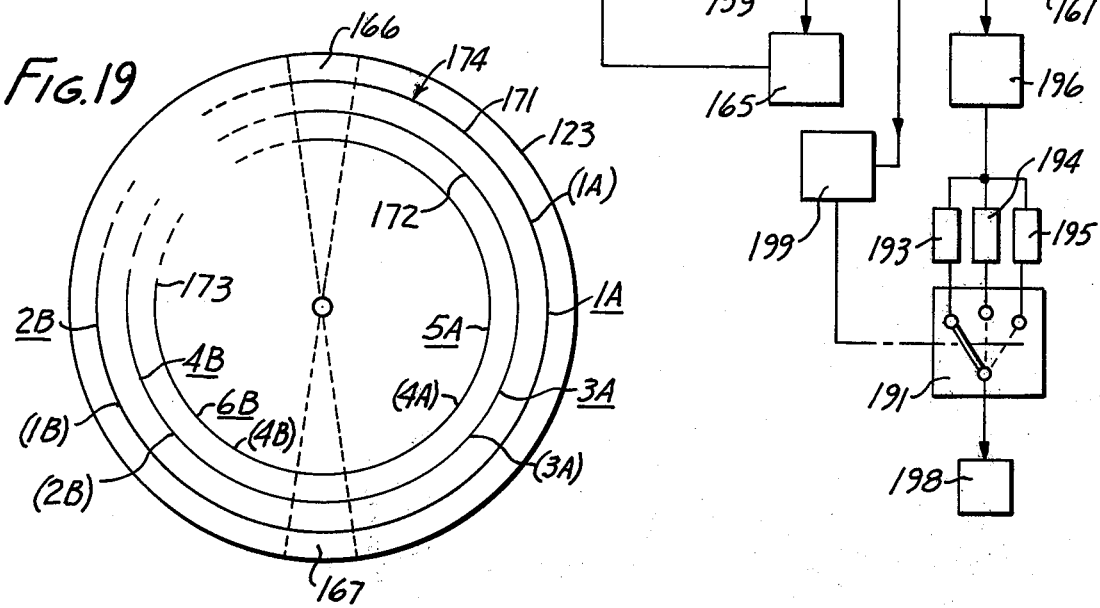
FIG. 19 is a diagrammatic top view of a video disk useful in the equipment of FIG 18.
Figure 20:
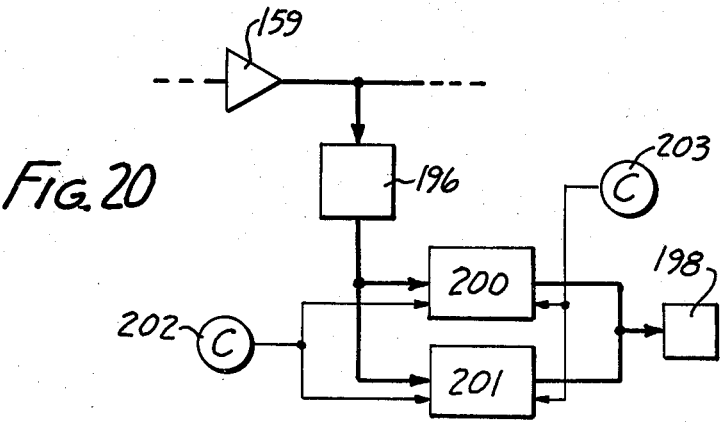
FIG. 20 is a block diagram of a modification of the equipment of FIG. 18.
Figure 21:
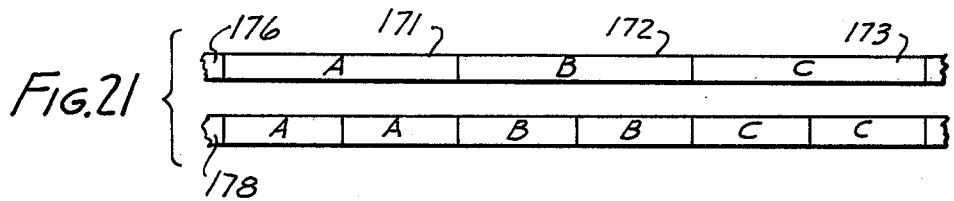
FIGS. 21 to 24 show and illustrate various recording and reproduction patterns.

To energize the control 165 at the correct instant, control signals may be recorded on the disk 123, such as during one or more segments, shown at 166 and 167 in FIG. 19, during which the recording of the vertical retrace signal takes place. These mirror flyback control signals may be of any suitable type, and the control signal detector in the control 165 may be of any corresponding kind. For instance, the control signals may comprise a series of pulses, which are detected by the control 165, and the number of which indicates when and how often the doublet generator 153 is to be energized.

Utilizations of the video disk recording and playback equipment of FIG. 18 will now be disclosed with the aid of FIGS. 19 to 24.

In particular, FIG. 10 symbolically shows three adjacent recording track portions 171, 172, and 173 of a spiral recording track 174. In accordance with a diagram 176 of FIG. 21, a first video image frame or field A is recorded in the track portion 171. A second image field or frame B is recorded in the track portion 172, and a third image field or frame C is recorded in the track portion 173. Each field or frame may occupy an entire revolution of the track, as desired. By energizing the doublet generator 153 at the end of each odd-numbered revolution of the video disk 123, each of the image fields or frames A, B and C is reproduced twice as shown in the diagram 178 of FIG. 21.

At the same time, the video disk is driven twice as fast as it was driven during recording. Assuming that the image fields or frames A, B and C were recorded at one half the display scan rate, the playback method according to the preferred embodiment of the subject invention as just disclosed will both increase the scan rate of the video signal to the requisite display scan rate and reduce flicker by reproducing and displaying every image field or frame twice. Of course, other playback patterns, such as those disclosed above in connection with the video tape version, may be effected as desired.

Figure 22:
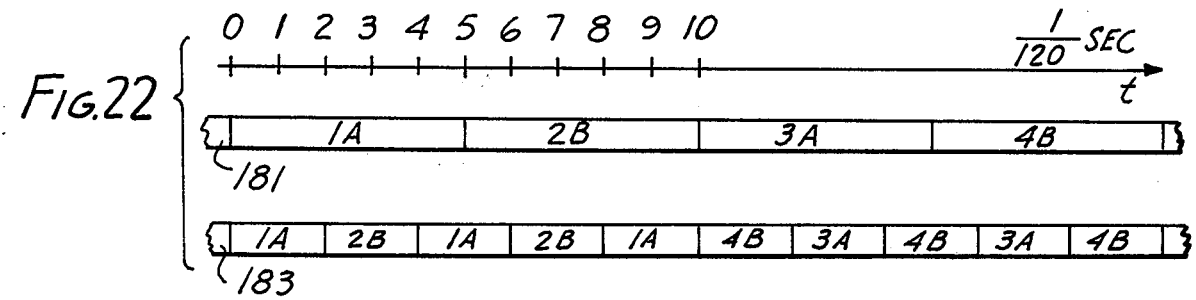
Figure 23:
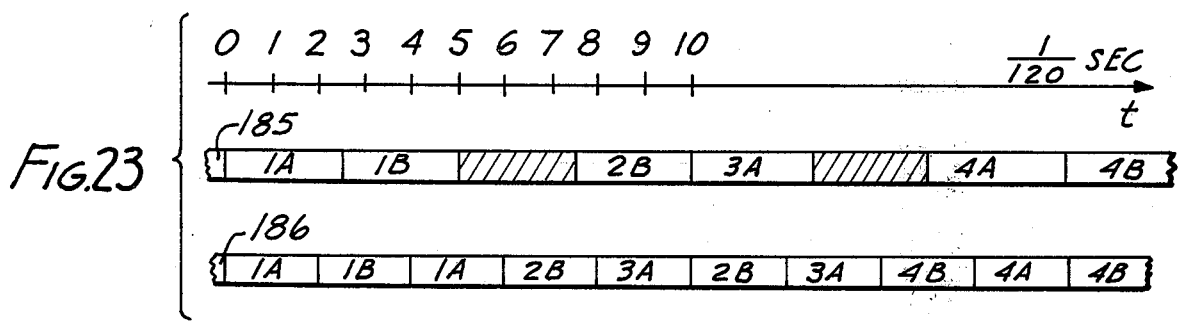
Figure 24:
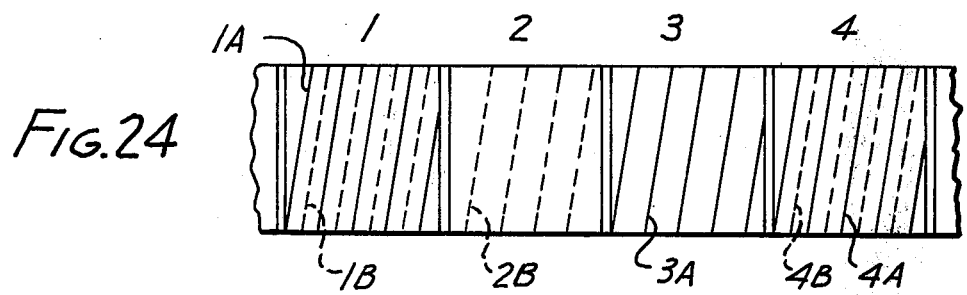

Two particularly advantageous patterns will now be disclosed with the aid of FIGS. 22 to 24. While this part of the disclosure is styled in terms of video disk recording and playback, it should be understood that it has also application to the video tape version of the disclosed systems.

The patterns of FIGS. 22 and 23 have particular utility in the reproduction of video recordings by motion picture frame scanning. In that case, it is important to convert the standard motion picture rate of 24 motion picture image frames per second into the standard television scanning rate of 60 fields per second.

A recently promulgated approach attempts to solve this problem by scanning, say, each odd-numbered motion picture frame three times 1/60 sec. and each even-numbered frame twice at 1/60 sec. so that the total time for five video fields is 1/12 sec.

It is clear that that type of film to video conversion places a considerable amount of redundant information on the tape or disk. Unfortunately, this redundancy of information does not even contribute toward any increase in motion sensitivity of the resulting display, since that motion sensitivity is, of course, limited by the 24 frames per second of the motion picture film which is being scanned.

From this fact situation I have concluded that the average motion sensitivity remains intact as long as at least 24 frames per second are recorded on the video disk or tape. The requisite video display scan rate can then be generated in accordance with the principles of the subject invention. As a by-product, longer play times can be generated.

For the purpose of the examples shown in FIGS. 22 and 23, each of the track portions or revolutions 171 to 173 shown in FIG. 19 is considered subdivided into a first half to the right side of the sectors 166 and 167 and a second half to the left side of these sectors. The image fields are individually designated by a numeral corresponding to the frame of which they are part (two fields A and B for each frame), and by a letter indicating whether it is the first field (A) or the second field (B) of the particular frame.

By way of example, the diagram 181 in FIG. 22 shows that the first field of the first frame (1A), the second field of the second frame (2B), the first field of the third frame (3A), the second field of the fourth frame (4B), et seq. are recorded on the video disk 123.

The time axis (t) also shown that each field is recorded in 5/120 sec. 24 fields or twelve frames may thus be recorded per second.

In FIG. 19, each half of each track portion 171 to 173 is designated by a reference corresponding to the designation contained in the diagram 181 and being underlined to distinguish that case from the case illustrated in FIG. 23 and to be disclosed below. In particular, the field 1A is recorded by the modulated beam of the laser 128 in the first half of the first track portion 171. No recording of video information then takes place for the equivalent of a full revolution of the video disk 123. Accordingly, the fields 1B and 2A are skipped. With conventional type of film scanning equipment, the fields may be blanked during these skipping intervals. In this manner, the second half of the track portion 171 will reach the recording beam, which will be placed thereon with the aid of the doublet generator 163. The next field in succession, namely the field 2B, will now be recorded in the second half of the track portion 171. In basically the same manner, the field 3A will be recorded in the first half of the recording track portion 172, the field 4B in the second half of that track portion, the field 5A in the first half of the track portion 173, and the field 6B in the second half of that track portion. During this recording operation, the drive 121 rotates the video disk at a rate of 3600 divided by the number of fields per revolution (e.g. 2) times a factor equal to the quotient of the motion picture frame rate (e.g. 24) divided by the video image field rate (e.g. 60), yielding in the example under consideration a recording velocity of the disk of 720 rpm.

During the corresponding playback operation, the drive 121 rotates the disk at 1800 rpm to provide the standard video display rate of 60 fields or 30 frames per second. As shown by the diagram 183 of FIG. 22, the first and second halves of the track portion 171 are repeatedly scanned so that the field 1A is reproduced three times and the field 2B is reproduced twice in a mutually interlaced fashion. The second and first halves of the track portion 172 is thereby scanned repeatedly so that the fields 3A and 4B are reproduced twice and three times, respectively, in a mutually interlaced fashion. The remaining recording fields are reproduced in the same manner, until the entire recording has been played back. One further advantage of the example just disclosed is that the play time is increased by a factor of 2.5. The recording diagram 185 of FIG. 23 ties in with the parenthetical references in FIG. 19 and shown what fields of a scanned motion picture are recorded where. In particular, FIGS. 19 and 23 show that the field 1A is recorded in the first half of the track 171, the field 1B in the second half of that track, the field 2B in the second half of the track 172, the field 3A in the first half of that track, the field 4A in the first half of track 173, and the field 4B in the second half of that track.

The diagram 185 further shows blank spaces for some of the fields that are not recorded. In reality, these blank spaces do not exist on the video disk, since the recording beam is returned to the beginnng of each subsequent track portion or track portion fraction as mentioned above.

For the purpose of increased clarity, FIG. 24 shows the fields which are recorded in relationship to the motion picture image frames 1, 2, 3, 4 et seq. It is thus seen that both fields are recorded for the frames one and four, but only the second field for the frame two and first field for the frame three of the scanned motion picture.

The diagram 186 in FIG. 23 then shown how the recorded fields are repeatedly reproduced during playback at increased recording disk velocity so as to provide the requisite motion picture display scan rate. In practice, an increase in play time of 1.7 is achieved by this method.

The video disk recording and methods so far described have particular utility in cases where no sound accompaniment is present with the recorded video information.

In the case of sound accompaniment, the sound is preferably recorded in a standard manner in a marginal sound channel of the tape in the tape version of the illustrated preferred embodiment. In the video disk version, the sound may either be distributed over more than one channel per revolution or may be compressed into a short interval per revolution.

In the former case, the particular sound channels are appropriately sequenced during repeated playback while the compressed sound accompaniment is appropriately expanded and spread over the repeated reproduction.

By way of example, a sequencer 191 connects a source of sound accompaniment, such as the video track playback equipment of a motion picture scanner (not shown), alternatively to three audio channels 193, 194 and 195. These channels may be different frequency band channels, as is conventional in video disk recording. The three channels are modulated onto the recording beam and are thus recorded onto the disk 123. Upon playback, the audio information is derived by an audio separator 196 from the signal generated by the photoelectric reading beam detector 158. This regenerated audio accompaniment is picked up in the channels 193, 194 and 195 and is appropriately distributed from these channels by the sequencer 191 to audio reproduction equipment 198 which may, for instance, include sound amplifier and loud speaker equipment. The sequencer 191 may be actuated by a driver 199 which may be energized by code signals recorded on and reproduced from the disk and being similar in nature to the code signals which control the actuation of the doublet or flyback pulse generator 163, but being sufficiently distinct therefrom to avoid mutual interference.

If desired or necessary, the sound input equipment 192 may include recording and playback equipment to adapt the frequency of the audio signal to the slow scan of the video recording process, so that the sound accompaniment has real time frequency at the audio reproducing equipment 198.

A different approach in accordance with a preferred embodiment of the subject invention resides in a compression of the audio accompaniment into the sectors 166 and 167 reserved on the video disk for vertical retrace signals of the video information. This compression and recording of the audio information can be accomplished with the aid of shift registers which clock in the audio information at the first rate and clock out that information at a second rate. The compressed audio information is thus recorded within the sectors 166 and 167 at the above mentioned first relative recording medium velocity.

Upon playback, the compressed audio information is reproduced with the aid of the reading beam at the above mentioned second relative velocity. The real time nature of the audio accompaniment is then restored, such as with the aid of the shift register system shown in FIG. 20.

In particular, the audio separation and pickup equipment 196 applies the reproduced compressed audio accompaniment to two alternatively operating shift registers 200 and 201.

A first clock 202 clocks in the compressed sound accompaniment at a first rate and a clock 203 clocks the sound accompaniment out of the registers 200 and 201 at a higher second rate so as to restore the real time nature of the sound accompaniment which is thereupon rendered audible by the audio equipment 198 in synchronism with the displayed video information.

The subject extensive disclosure will suggest or render apparent various modifications and variations within the spirit and scope of the invention to those skilled in the art.

I claim:

1. In a method of recording video information on a recording medium having a multiply coiled recording track, and subsequently displaying said video information at a display scan rate, an improvement for reducing the size of the recording medium relative to a size requisite for a recording at said display scan rate, comprising in combination the steps of:

providing signals which include said video information in a series of video signal quanta synchronized at a scan rate lower than said display scan rate;

recording said signals including said video signal quanta on said recording medium at a first relative recording medium velocity and in accordance with the arithmetic progression $$u = a + (n - 1)d$$

wherein:

$u$ denotes the numbers of the quanta which are recorded, $a$ and $d$ are positive integers above zero, and $n$ is the order of any term in the progression, reproducing said recorded signals including said recorded video signal quanta in a reproducing operation at a second relative velocity being higher than said first velocity so that said reproduced video signal quanta are synchronized at said display scan rate; repeating in the same reproducing operation the reproduction of recorded video signal quanta at said second relative velocity, the repeated reproduction of any recorded video signal quantum in the same reproducing operation being completed before commencement of the reproduction of any recorded video signal quantum whose number in said arithmetic progression occurs more than one term after the number of the particular video signal quantum; and displaying at said display scan rate the video information contained in said reproduced video signal quanta.

2. A method as claimed in claim 1, including the step of:

reproducing each recorded video signal quantum $m$ times, wherein $m$ is the quotient of said second relative velocity divided by said first relative velocity.

3. A method as claimed in claim 1, including the steps of:

recording all of said video signal quanta synchronized at said lower scan rate on said recording medium.

4. A method as claimed in claim 3, including the step of:

reproducing each recorded video signal quantum $m$ times, wherein $m$ is the quotient of said second relative velocity divided by said first relative velocity.

5. A method as claimed in claim 1, including the steps of:

recording on said recording medium with a single recording device said video signal quanta synchronized at said lower scan rate; and repeatedly reproducing said recorded video signal quanta at said second relative velocity with more than one playback device.

6. A method as claimed in claim 5, including the steps of:

advancing said recording medium;

holding said single recording device stationary relative to said advancing recording medium; and rotating said playback devices during said reproductions of said recorded video signal quanta.

7. A method as claimed in claim 1, including the steps of:

providing a video recording disk having a multiply coiled recording track; and recording said signals including said video signal quanta in said multiply coiled recording track.

8. A method as claimed in claim 1, including the steps of:

providing a video recording tape having a recording track;

winding said recording tape into a coil having multiple turns along which said recording track extends;

unwinding said recording tape from said coil;

recording said signals including said video signal quanta on said unwound recording tape at said first relative recording medium velocity and in accordance with said arithmetic progression; and rewinding said recording tape into a coil having multiple turns along which said recording track extends.

9. A method as claimed in claim 1, including the steps of:

providing an audio accompaniment for said video information;

recording said audio accompaniment on said recording medium at said first relative recording medium velocity;

reproducing said recorded audio accompaniment during reproduction of said recorded signals; and rendering said reproduced audio accompaniment audible.

10. A method as claimed in claim 9, including the steps of:

compressing said provided audio accompaniment relative to real time;

recording said compressed audio accompaniment on said recording medium at said first relative recording medium velocity;

reproducing said recorded compressed audio accompaniment at said second relative velocity and restoring the real time nature of said audio accompaniment; and rendering said restored real time audio accompaniment audible in synchronism with said displayed video information.

11. A method as claimed in claim 9, including the steps of:

providing more than one audio channel;

distributing said provided audio accompaniment over said audio channels;

recording said distributed audio accompaniments on said recording medium in said audio channels at said first relative recording medium velocity;

reproduciing said recorded audio accompaniment sequentially from said audio channels during reproduction of said recorded signals; and rendering said reproduced audio accompaniment audible in synchronism with said video information.

12. A method as claimned in claim 1, including the steps of:

providing a video recording disk having a multiply coiled recording track;

recording said signals including said video signal quanta in said multiply coiled recording track;

providing a video signal pickup for reproducing recorded video signals;

directing said video signal pickup onto a particular portion of said coiled recording track for a reproduction of a particular video signal quantum; and redirecting said video signal pickup onto said particular recording track portion for each repeated reproduction of said particular video signal quantum.

13. A method as claimed in claim 12, including the steps of:

recording a first video signal quantum in a first portion of said multiply coiled track corresponding to a first revolution of said video disk;

recording a second video signal quantum in a second portion of said multiply coiled track corresponding to a second revolution of said video disk;

recording a third video signal quantum in a third portion of said multiply coiled track corresponding to a third revolution of said video disk;

directing and subsequently redirecting said pickup onto said first portion of said track during two subsequent revolutions of said video disk;

directing and subsequently redirecting said pickup onto said second portion of said track during two further revolutions of said video disk; and directing and subsequently redirecting said pickup onto said third portion of said track during two yet further revolutions of said video disk.

14. A method as claimed in claim 12, including the steps of:

recording a first video signal quantum in a first half of a first portion of said multiply coiled track;

recording a second video signal quantum in the second half of said first track portion;

recording a third video signal quantum in a first half of a second portion of said track;

recording a fourth video signal quantum in the second half of said second track portion;

recording a fifth video signal quantum in a first half of a third portion of said track;

recording a sixth video signal quantum in the second half of said third track portion;

directing and subsequently redirecting said pickup unto said first portion of said track;

directing and subsequently redirecting said pickup unto said second portion of said track; and directing and subsequently redirecting said pickup unto said third portion of said track.

15. A method as claimed in claim 14, including the steps of:

providing and recording one image field of a first video image frame as said first video signal quantum;

providing and recording one image field of a second video image frame as said second video signal quantum;

providing and recording one image field of a third video image frame as said third video signal quantum;

providing and recording one image field of a fourth video image frame as said fourth video signal quantum;

providing and recording one image field of a fifth video image frame as said fifth video signal quantum; and providing and recording ome image field of a sixth video image frame as said sixth video signal quantum.

16. A method as claimed in claim 14, including the steps of:

providing and recording a first image field of a first video image frame as said first video signal quantum;

providing and recording a second image field of a second video image frame as said second video signal quantum;

providing and recording a first image field of a third video image frame as said third video signal quantum;

providing and recording a second image field of a fourth video image frame as said fourth video signal quantum;

providing and recording a first image field of a fifth video image frame as said fifth video signal quantum; and providing and recording a second image field of a sixth video image frame as said sixth video signal quantum, with said image fields of said first, third and fifth video image frames corresponding to each other and said second image fields of said second, fourth and sixth video image frames corresponding to each other.

17. A method as claimed in claim 14, including the steps of:

providing and recording a first image field of a first video image frame as said first video signal quantum;

providing and recording the second image field of said first video image frame as said second video signal quantum;

providing and recording a first image field of a third video image frame as said third video signal quantum;

providing and recording a second image field of a second video image frame as said fourth video signal quantum;

providing and recording a first image field of a fourth video image frame as said fifth video signal quantum; and providing and recording a second image field of a fourth video image frame as said sixth video signal quantum.

18. A method of recording video information on a recording medium having a multiply coiled recording track, and subsequently displaying said video information at a display scan rate, an improvement for reducing the size of the recording medium relative to a size requisite for a recording at said display scan rate, comprising in combination the steps of:

providing signals which include said video information in a series of image fields synchronized at a scan rate lower than said display scan rate;

recording said signals including said image fields on said recording medium at a first relative recording medium velocity and in accordance with the arithmetic progression $$u = a + (n - 1)d$$

wherein:

$u$ denotes the numbers of the image fields which are recorded, $a$ and $d$ are positive integers above zero, and $n$ is the order of any term in the progression;

reproducing said recorded video signals including said recorded image fields in a reproducing operation at a second relative velocity being higner than said first velocity so that said reproduced image fields are synchronized at said display scan rate;

repeating in the same reproducing operation the reproduction of recorded image fields at said second relative velocity, the repeated reproduction of any recorded image field in the same reproducing operation being completed before commencement of the reproduction of any recorded image field whose number in said arithmetic progression occurs more than one term after the number of the particular image field; and displaying the information contained in said reproduced image fields at said display scan rate.

19. A method as claimed in claim 18, including the step of:

reproducing each recorded image field $m$ times, wherein $m$ is the quotient of said second relative velocity divided by said first relative velocity.

20. A method as claimed in claim 18, including the step of:

recording all of said image fields synchronized at said lower scan rate on said recording medium.

21. A method as claimed in claim 20, including the step of:

reproducing each recorded image field $m$ times, wherein $m$ is the quotient of said second relative velocity divided by said first relative velocity.

22. A method as claimed in claim 18, including the steps of:

recording on said recording medium with a single recording device said image fields synchronized at said lower scan rate; and repeatedly reproducing said recorded image fields at said second relative velocity with more than one playback device.

23. A method as claimed in claim 22, including the steps of:

advancing said recording medium;

holding said single recording device stationary relative to said advancing recording medium; and rotating said playback devices during said reproductions of said recorded image fields.

24. A method as claimed in claim 18, including the step of:

completing the repeated reproduction of any recorded image field in the same reproducing operation before commencement of the reproduction of any further recorded image field.

25. A method as claimed in claim 18, including the step of:

effecting the repeated reproduction of each recorded image field after the reproduction of an immediately adjacent image field in said arithmetic progression.

26. A method as claimed in claim 25, including the step of:

reproducing each recorded image field $m$ times, wherein $m$ is the quotient of said second relative velocity divided by said first relative velocity.

27. A method as claimed in claim 18, including the step of:

recording said selected image fields linearly on said recording medium and making the spacings between adjacent recorded image fields shorter than the length of a recorded image field.

28. A method as claimed in claim 18, including the steps of:

providing a video recording disk having a multiply coiled recording track; and recording said signals including said image fields in said multiply coiled recording track.

29. A method as claimed in claim 18, including the steps of:

providing a video recording tape having a recording track;

winding said recording tape into a coil having multiple turns along which said recording track extends;

unwinding said recording tape from said coil;

recording said signals including said image fields on said unwound recording tape at said first relative recording medium velocity and in accordance with said arithmetic progression; and rewinding said recording tape into a coil having multiple turns along which said recording track extends.

30. In a method of playing back video information from a recording medium having a multiply coiled recording track containing a video recording produced by a method including the steps of providing signals which include said video information in a series of video signal quanta synchronized at a scan rate lower than a predetermined display scan rate, and recording said signals including said video signal quanta on said recording medium at a first relative recording medium velocity and in accordance with the arithmetic progression $$u = a + (n - l)d$$

wherein:

$u$ denotes the numbers of the quanta which are recorded, $a$ and $d$ are positive integers above zero, and $n$ is the order of any term in the progression, the improvement comprising in combination the steps of:

reproducing said recorded signals including said recorded video signal quanta from said video recording in a reproducing operation effected at a second relative recording medium velocity being higher than said first velocity so that said reproduced video signal quanta are synchronized at said display scan rate;

repeating in the same reproducing operation the reproduction of recorded video signal quanta at said second relative velocity, the repeated reproduction of any recorded video signal quantum in the same reproducing operation being completed before commencement of the reproduction of any recorded video signal quantum whose number in said arithmetic progression occurs more than one term after the number of the particular video signal quantum; and displaying at said display scan rate the video information contained in said reproduced video signal quanta.

31. A method as claimed in claim 30, including the step of:

reproducing each recorded video signal quantum $m$ times, wherein $m$ is the quotient of said second relative velocity divided by said first relative velocity.

32. A method as claimed in claim 30, including the step of:

repeatedly reproducing said recorded video signal quanta at said second relative velocity with more than one playback device.

33. A method as claimed in claim 32, including the step of:
rotating said playback devices during said reproductions of said recorded video signal quanta.

34. A method as claimed in claim 30, wherein said multiply coiled recording track is contained in a video recording disk, and wherein said reproducing operations include the steps of:
repeatedly reproducing said recorded signals including said recorded video signal quanta from said multiply coiled recording track of said video recording disk.

35. A method as claimed in claim 30, wherein said multiply coiled recording track is contained on a video recording tape wound into a coil having multiple turns along which said recording track extends, and wherein said reproducing operations include the steps of:
unwinding said recording tape from said coil;
repeatedly reproducing said recorded signals including said recorded video signal quanta from said unwound recording tape; and
rewinding said recording tape into a coil having multiple turns along which said recording track extends.

36. In a method of playing back video information from a recording medium having a multiply coiled recording track containing a video recording produced by a method including the steps of providing signals which include said video information in a series of image fields synchronized at a scan rate lower than a predetermined display scan rate, and recording said signals including said image fields on said recording medium at a first relative recording medium velocity and in accordance with the arithmetic progression $$u = a + (n - 1)d$$

wherein:
$u$ denotes the numbers of the image fields which are recorded,
$a$ and $d$ are positive integers above zero, and
$n$ is the order of any term in the progression,
the improvement comprising in combination the steps of:
reproducing said recorded video signals including said recorded image fields in a reproducing operation at a second relative recording medium velocity being higher than said first velocity so that said reproduced image fields are synchronized at said display scan rate;
repeating in the same reproducing operation the reproduction of recorded image fields at said second relative velocity, the repeated reproduction of any recorded image field in the same reproducing operation being completed before commencement of the reproduction of any recorded image field whose number in said arithmetic progression occurs more than one term after the number of the particular image field; and
displaying the information contained in said reproduced image fields at said display scan rate.

37. A method as claimed in claim 36, including the step of:
reproducing each recorded image field $m$ times, wherein $m$ is the quotient of said second relative velocity divided by said first relative velocity.

38. A method as claimed in claim 36, including the step of:
repeatedly reproducing said recorded image fields at said second relative velocity with more than one playback device.

39. A method as claimed in claim 38, including the step of:
rotating said playback devices during said reproductions of said recorded image fields.

40. A method as claimed in claim 36, wherein said multiply coiled recording track is contained in a video recording disk, and wherein said reproducing operations include the steps of:
repeatedly reproducing said recorded signals including said recorded image fields from said multiply coiled recording track of said video recording disk.

41. A method as claimed in claim 36, wherein said multiply coiled recording track is contained on a video recording tape wound into a coil having multiple turns along which said recording track extends, and wherein said reproducing operations include the steps of:
unwinding said recording tape from said coil;
repeatedly reproducing said recorded signals including said recorded image fields from said unwound recording tape; and
rewinding said recording tape into a coil having multiple turns along which said recording track extends.

42. In apparatus for recording video information on a recording medium having a multiply coiled recording track, and subsequently displaying said video information at a display scan rate, an improvement for reducing the size of the recording medium relative to a size requisite for a recording at said display scan rate, comprising in combination:
means for providing signals which include said video information in a series of video signal quanta synchronized at a scan rate lower than said display scan rate;
means for recording said signals including said video signal quanta on said recording medium at a first relative recording medium velocity and in accordance with the arithmetic progression $$u = a + (n - 1)d$$

wherein:
$u$ denotes the numbers of the quanta which are recorded,
$a$ and $d$ are positive integers above zero, and
$n$ is the order of any term in the progression; and
means for reproducing said recorded signals including said recorded video signal quanta at a second relative velocity being higher than said first velocity so that said reproduced video signal quanta are synchronized at said display scan rate, said reproducing means including means for repeating in the same reproducing operation the reproduction of recorded video signal quanta at said second relative velocity, said repeating means including means for completing the repeated reproduction of any recorded video signal quantum in the same reproducing operation before commencement of the reproduction of any recorded video signal quantum whose number in said arithmetic progression occurs more than one term after the number of the particular signal quantum.

43. An apparatus as claimed in claim 42, wherein:
said reproducing means include means for reproducing each recorded video signal quantum $m$ times, wherein $m$ is the quotient of said second relative velocity divided by said first relative velocity.

44. An apparatus as claimed in claim 42, wherein:
said recording means include means for recording on said recording medium all of said video signal quanta synchronized at said lower scan rate.

45. An apparatus as claimed in claim 44, wherein:
said reproducing means include means for reproducing each recorded video signal quantum $m$ times, wherein $m$ is the quotient of said second relative velocity divided by said first relative velocity.

46. An apparatus as claimed in claim 42, wherein:
said recording means include a single recording device for recording said signals on said recording medium; and
said reproducing means include more than one playback device.

47. An apparatus as claimed in claim 46, wherein:
said recording means include means for maintaining said single recording device stationary during said recording; and
said reproducing means include means for rotating said playback devices during said reproductions of said recorded video signal quanta.

48. An apparatus as claimed in claim 42, wherein:
said recording medium is a video recording disk having a multiply coiled recording track; and
said recording means include means for recording said signals including said video signal quanta in said multiply coiled recording track.

49. An apparatus as claimed in claim 42, wherein:
said recording medium is a video recording tape having a recording track; and
said recording means include means for winding said recording tape into a coil having multiple turns along which said recording track extends and for unwinding recording tape from a coil, and means for recording said signals including said video signal quanta onto said unwound tape.

50. An apparatus as claimed in claim 42, including:
means for providing an audio accompaniment for said video information;
means for recording said audio accompaniment on said recording medium at said first relative recording medium velocity; and
means for reproducing said recorded audio accompaniment during the reproduction of said recorded signals.

51. An apparatus as claimed in claim 50, wherein:
said audio accompaniment providing means include means for compressing said audio accompaniment relative to real time;
said audio accompaniment recording means include means for recording said compressed audio accompaniment on said recording medium at said first relative recording medium velocity; and
said reproducing means include means for reproducing said recorded compressed audio accompaniment at said second relative velocity and restoring the real time nature of said audio accompaniment.

52. An apparatus as claimed in claim 50, wherein:
said audio accompaniment recording means include means for recording said audio accompaniment in more than one audio channel; and
said reproducing means include means for reproducing said recorded audio accompaniment sequentially from said audio channels during reproduction of said recorded signals.

53. An apparatus as claimed in claim 42, wherein:
said recording medium is a video recording disk having a multiply coiled recording track;
said recording means include means for recording said signals in said recording track; and
said reproducing means include video signal pickup means for reproducing recorded video signals, and means for repeatedly directing said pickup means onto a particular portion of said coiled recording track for a reproduction of a particular video signal quantum.

54. In apparatus for recording video information on a recording medium having a multiply coiled recording track and subsequently reproducing said video information at a display scan rate, an improvement for reducing the size of the recording medium relative to a size requisite for a recording at said display scan rate, comprising in combination:
means for providing signals which include said video information in a series of image fields synchronized at a scan rate lower than said display scan rate;
means for recording said signals including said image fields on said recording medium at a first relative recording medium velocity and in accordance with the arithmetic progression $$u = a + (n - 1)d$$

wherein:
$u$ denotes the numbers of the image fields which are recorded,
$a$ and $d$ are positive integers above zero, and
$n$ is the order of any term in the progression; and
means for reproducing said recorded signals including said image fields at a second relative velocity being higher than said first velocity so that said reproduced image fields are synchronized at said display scan rate, said reproducing means include means for repeating in the same reproducing operation the reproduction of recorded image fields at said second relative velocity, said repeating means including means for completing the repeated reproduction of any recorded image field in the same reproducing operation before commencement of the reproduction of any recorded image field whose number in said arithmetic progression occurs more than one term after the number of the particular image field.

55. An apparatus as claimed in claim 54, wherein:
said reproducing means include means for reproducing each recorded image field $m$ times, wherein $m$ is the quotient of said second relative velocity divided by said first relative velocity.

56. An apparatus as claimed in claim 54, wherein:
said recording means include means for recording on said recording medium all of said image frames synchronized at said lower scan rate.

57. An apparatus as claimed in claim 56, wherein:
said reproducing means include means for reproducing each recorded image field $m$ times, wherein $m$ is the quotient of said second relative velocity divided by said first relative velocity.

58. An apparatus as claimed in claim 54, wherein:
said recording means include a single recording device for recording on said recording medium said signals including said image fields synchronized at said lower scan rate; and said reproducing means include more than one playback device.

59. An apparatus as claimed in claim 58, wherein:
said recording means include means for maintaining said single recording device stationary during said recording; and
said reproducing means include means for rotating said playback devices during said reproductions of said recorded image fields.

60. An apparatus as claimed in claim 54, wherein:
said reproducing means include means for completing the repeated reproduction of any recorded image field in the same reproducing operation before commencement of the reproduction of any further recorded image field.

61. An apparatus as claimed in claim 54, wherein:
said reproducing means include means for effecting the reproduction of each recorded image field after the reproduction of an immediately adjacent image field in said arithmetic progression.

62. An apparatus as claimed in claim 61, wherein:
said reproducing means include means for reproducing each recorded image field $m$ times, wherein $m$ is the quotient of said second relative velocity divided by said first relative velocity.

63. An apparatus as claimed in claim 54, wherein:
said recording means include means for recording said selected image fields linearly on said recording medium, and means for making the spacings between adjacent recorded image fields shorter than the length of a recorded image field.

64. An apparatus as claimed in claim 54, wherein:
said recording medium is a video recording disk having a multiply coiled recording track; and
said recording means include means for recording said signals including said image fields in said multiply coiled recording track.

65. An apparatus as claimed in claim 54, wherein:
said recording medium is a video recording tape having a recording track; and
said recording means include means for winding said recording tape into a coil having multiple turns along which said recording track extends and for unwinding recording tape from a coil, and means for recording said signals including said image fields onto said unwound tape.

66. In apparatus for playing back video information from a recording medium having a multiply coiled recording track containing a video recording procedure by a method including the steps of providing signals which include said video information in a series of video signals quanta synchronized at a scan rate lower than a predetermined display scan rate, and recording said signals including said video signal quanta on said recording medium at a first relative recording medium velocity and in accordance with the arithmetic progression $$u = a + (n - l)$$

wherein:
$u$ denotes the numbers of the quanta which are recorded,
$a$ and $d$ are positive integers above zero, and
$n$ is the order of any term in the progression,
the improvement comprising in combination:
means for reproducing said recorded signals including said recorded video signal quanta from said video recording at a second relative velocity being higher than said first velocity so that said reproduced video signal quanta are synchronized at said display scan rate, said reproducing means including means for repeating in the same reproducing operation the reproduction of recorded video signal quanta at said second relative velocity, said repeating means including means for completing the repeated reproduction of any recorded video signal quantum in the same reproducing operation before commencement of the reproduction of any recorded video signal quantum whose number in said arithmetic progression occurs more than one term after the number of the particular signal quantum.

67. An apparatus as claimed in claim 66, wherein:
said reproducing means include means for reproducing each recorded video signal quantum $m$ times, wherein $m$ is the quotient of said second relative velocity divided by said first relative velocity.

68. An apparatus as claimed in claim 66, wherein:
said recording means include means for recording on said recording medium all of said video signal quanta synchronized at said lower scan rate.

69. An apparatus as claimed in claim 68, wherein:
said reproducing means include means for reproducing each recorded video signal quantum $m$ times, wherein $m$ is the quotient of said second relative velocity divided by said first relative velocity.

70. An apparatus as claimed in claim 66, wherein:
said reproducing means include more than one playback device.

71. An apparatus as claimed in claim 70, wherein:
said reproducing means include means for rotating said playback devices during said reproductions of said recorded video signal quanta.

72. In apparatus for playing back video information from a recording medium having a multiply coiled recording track containing a video recording produced by a method including the steps of providing signals which include said video information in a series of image fields synchronized at a scan rate lower than a predetermined display scan rate, and recording said signals including said image fields on said recording medium at a first relative recording medium velocity and in accordance with the arithmetic progression $$u = a + (n - l)d$$

wherein:
$u$ denotes the numbers of the image fields which are recorded,
$a$ and $d$ are positive integers above zero, and
$n$ is the order of any term in the progression,
the improvement comprising in combination:
means for reproducing said recorded signals including said recorded image fields from said video recording at a second relative velocity being higher than said first velocity so that said reproduced image fields are synchronized at said display scan rate, said reproducing means including means for repeating in the same reproducing operation the reproduction of recorded image fields at said second relative velocity, said repeating means including means for completing the repeated reproduction of any recorded image fields in the same reproducing operation before commencement of the reproduction of any recorded image fields whose number in said arithmetic progression occurs more than one term after the number of the particular image field.

73. An apparatus as claimed in claim 72, wherein:
said reproducing means include means for reproducing each recorded image field $m$ times, wherein $m$ is the quotient of said second relative velocity divided by said first relative velocity.

74. An apparatus as claimed in claim 72, wherein:
said recording means include means for recording on said recording medium all of said image fields synchronized at said lower scan rate.

75. An apparatus as claimed in claim 74, wherein:
said reproducing means include means for reproducing each recorded image field $m$ times, wherein $m$ is the quotient of said second relative velocity divided by said first relative velocity.

76. An apparatus as claimed in claim 72, wherein:
said reproducing means include more than one playback device.

77. An apparatus as claimed in claim 76, wherein:
said reproducing means include means for rotating said playback devices during said reproductions of said recorded image fields.

78. An apparatus as claimed in claim 72, wherein:
said reproducing means include means for completing the repeated reproduction of any recorded image field in the same reproducing operation before commencement of the reproduction of any further recorded image field.

79. An apparatus as claimed in claim 72, wherein:
said reproducing means include means for effecting the reproduction of each recorded image field after the reproduction of an immediately adjacent image field in said arithmetic progression.

* * * * *